United States Patent
Cho

(10) Patent No.: US 10,948,701 B2
(45) Date of Patent: *Mar. 16, 2021

(54) VARIABLE MAGNIFICATION OPTICAL SYSTEM AND IMAGING APPARATUS

(71) Applicant: FUJIFILM Corporation, Tokyo (JP)

(72) Inventor: Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 116 days.

This patent is subject to a terminal disclaimer.

(21) Appl. No.: 16/273,993

(22) Filed: Feb. 12, 2019

(65) Prior Publication Data

US 2019/0265449 A1    Aug. 29, 2019

(30) Foreign Application Priority Data

Feb. 27, 2018 (JP) .............................. JP2018-033717
Dec. 26, 2018 (JP) .............................. JP2018-243491

(51) Int. Cl.
| | | |
|---|---|---|
| *G02B 15/14* | (2006.01) | |
| *G02B 15/177* | (2006.01) | |
| *G02B 17/08* | (2006.01) | |
| *G02B 27/00* | (2006.01) | |
| *G02B 13/00* | (2006.01) | |

(52) U.S. Cl.
CPC ....... *G02B 15/177* (2013.01); *G02B 13/0045* (2013.01); *G02B 17/0804* (2013.01); *G02B 27/0025* (2013.01); *G02B 13/009* (2013.01); *G02B 15/14* (2013.01); *G02B 17/08* (2013.01); *G02B 17/0808* (2013.01)

(58) Field of Classification Search
CPC .. G02B 27/0025; G02B 13/009; G02B 15/14; G02B 15/177; G02B 17/08; G02B 13/0045; G02B 17/0808; G02B 17/0804
USPC ....... 359/364–366, 432, 676, 683, 685, 686, 359/689, 691, 726, 727, 730, 731
See application file for complete search history.

(56) References Cited

U.S. PATENT DOCUMENTS

| | | |
|---|---|---|
| 4,235,508 A | 11/1980 | Kaprelian |
| 4,971,428 A | 11/1990 | Moskovich |
| 5,940,222 A | 8/1999 | Sinclair et al. |
| 2019/0265446 A1* | 8/2019 | Cho ..................... G02B 15/16 |

FOREIGN PATENT DOCUMENTS

| | | |
|---|---|---|
| CN | 106772963 A | 5/2017 |
| JP | H11-202208 A | 7/1999 |

* cited by examiner

*Primary Examiner* — Evelyn A Lester
(74) *Attorney, Agent, or Firm* — Studebaker & Brackett PC

(57) ABSTRACT

A variable magnification optical system consists of, in order from an object side, a first optical system remaining stationary during changing magnification and a second optical system including a plurality of lens groups moving during changing magnification. The first optical system includes a first mirror and a second mirror having reflective surfaces arranged to face each other. The first mirror has a reflective surface concave toward the object side. The second mirror has a reflective surface convex toward the image side. An intermediate image is formed between the second mirror and the second optical system. Predetermined conditional expressions relating to the partial dispersion ratios of the lenses included in the second optical system are satisfied.

20 Claims, 21 Drawing Sheets

EXAMPLE 1

EXAMPLE 2

EXAMPLE 3

EXAMPLE 4

EXAMPLE 5

EXAMPLE 8

EXAMPLE 9

EXAMPLE 10

FIG. 11
EXAMPLE 1
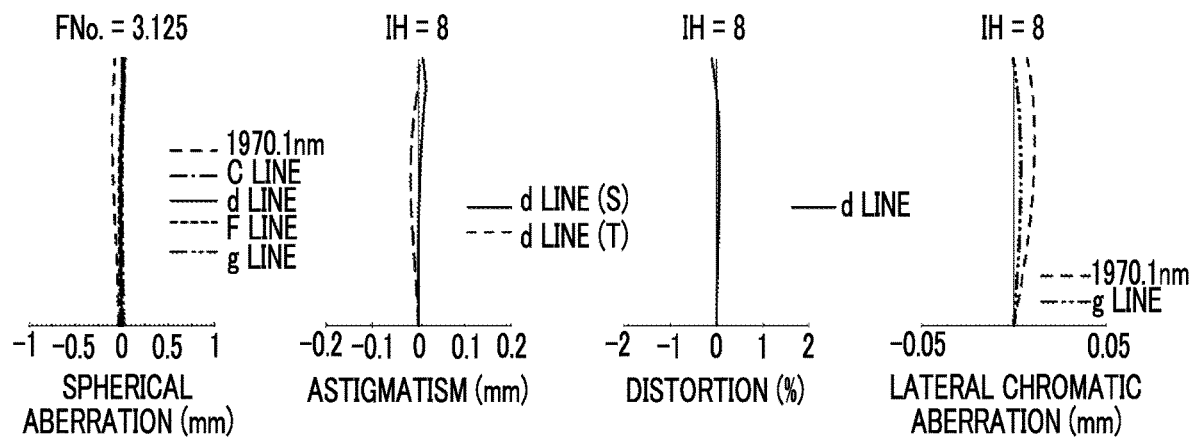
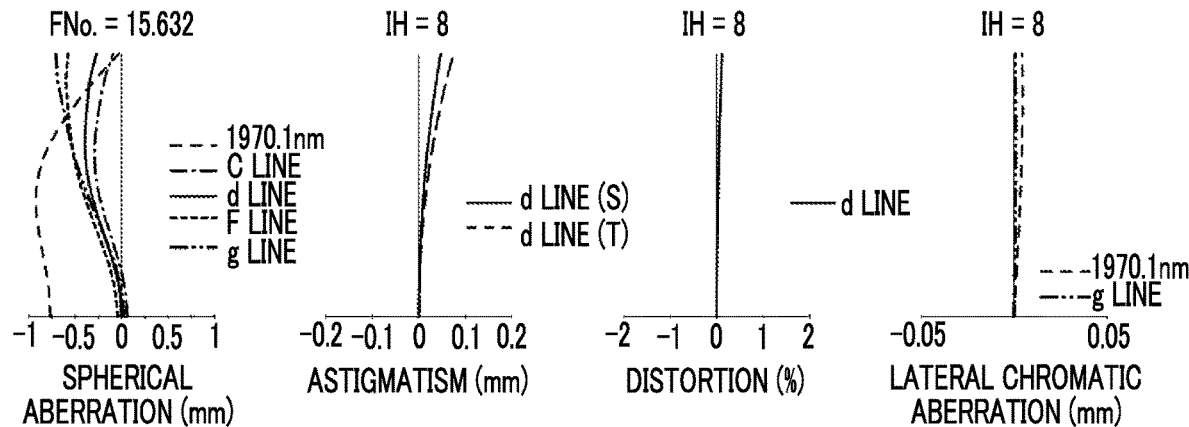

FIG. 12
EXAMPLE 2
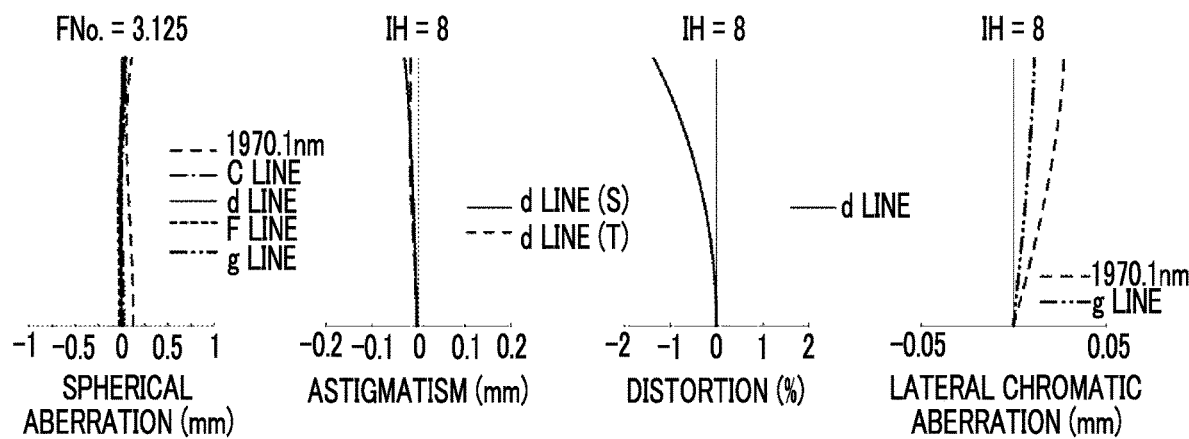
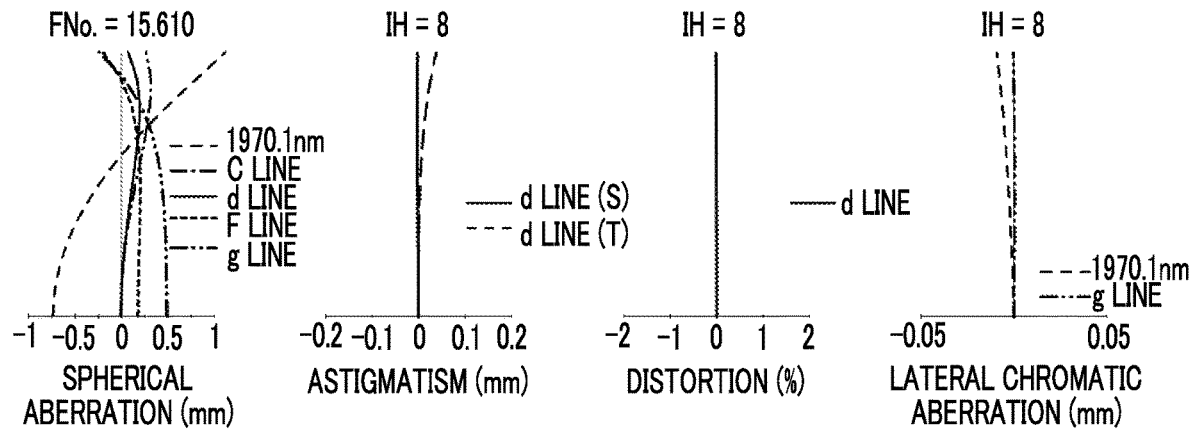

FIG. 13
EXAMPLE 3
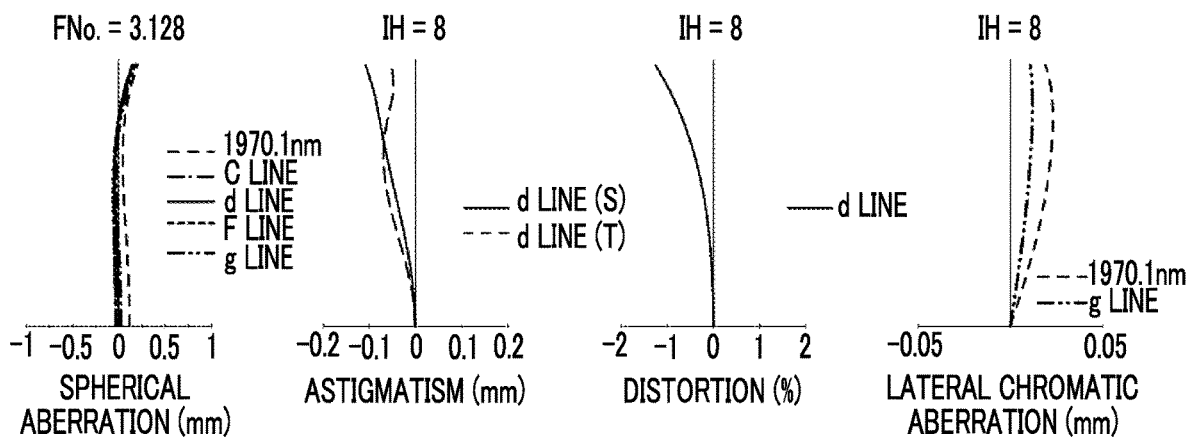
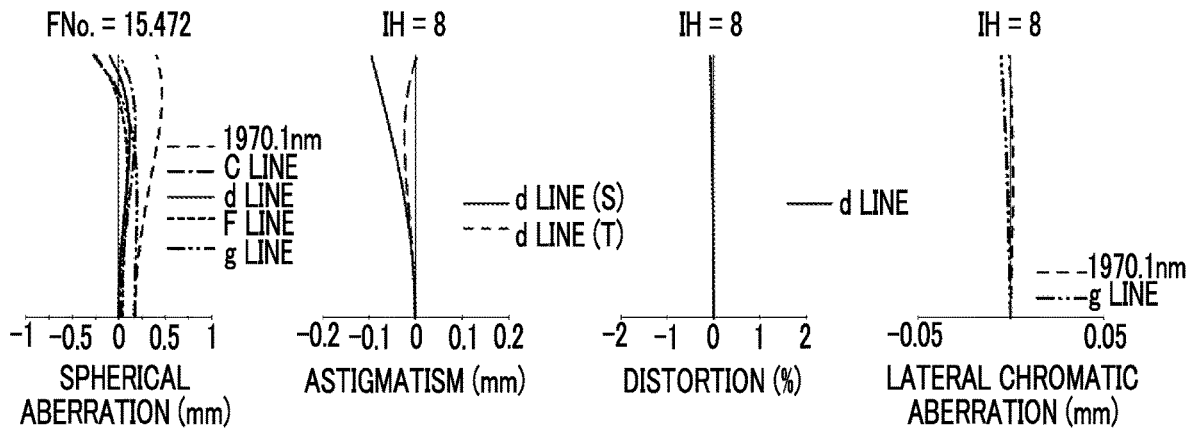

FIG. 14
EXAMPLE 4
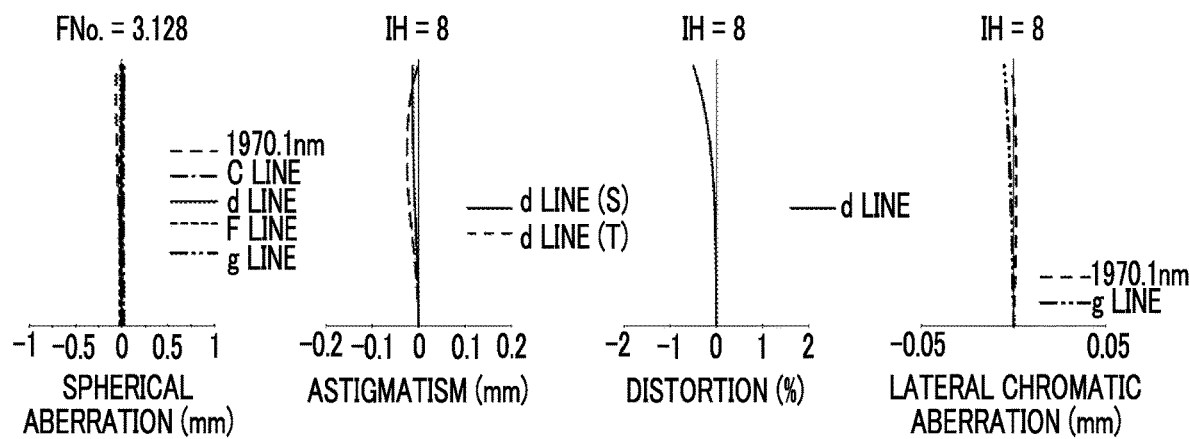
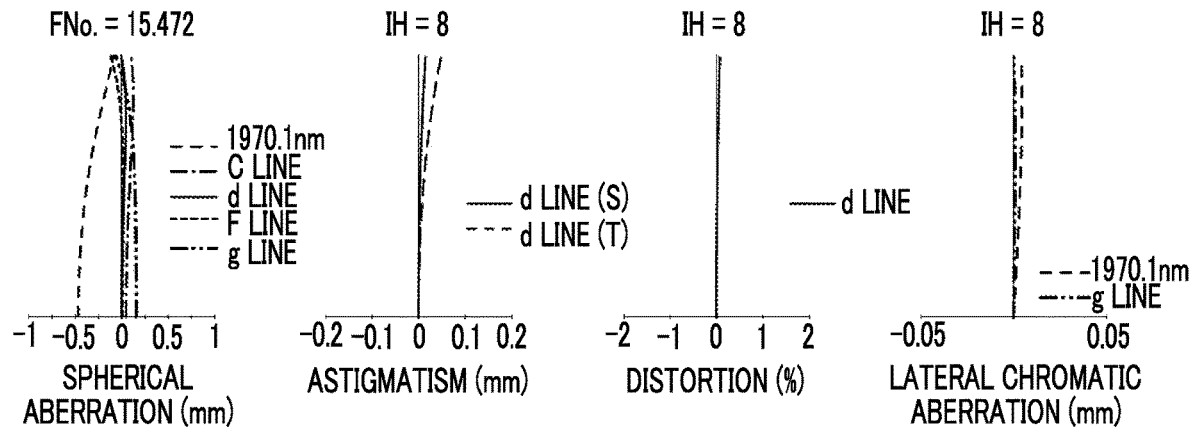

FIG. 15
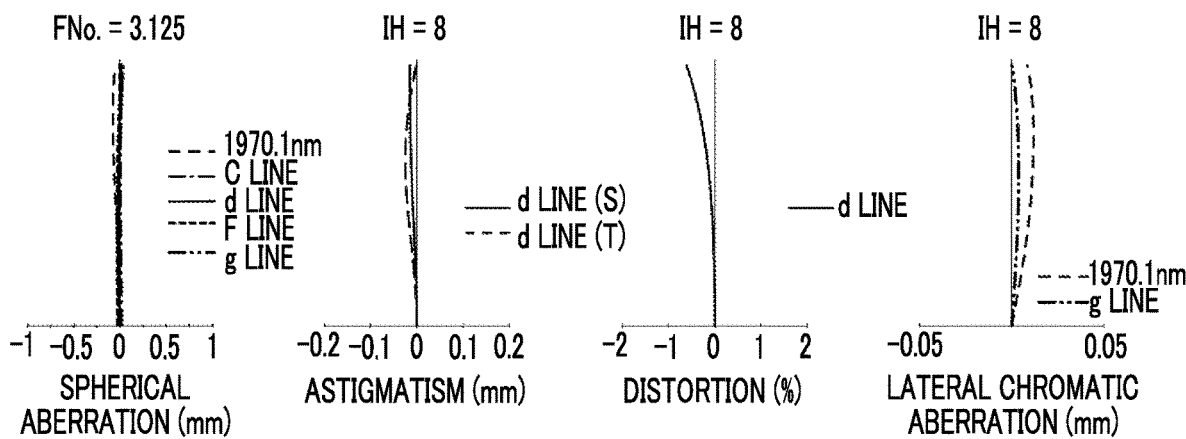
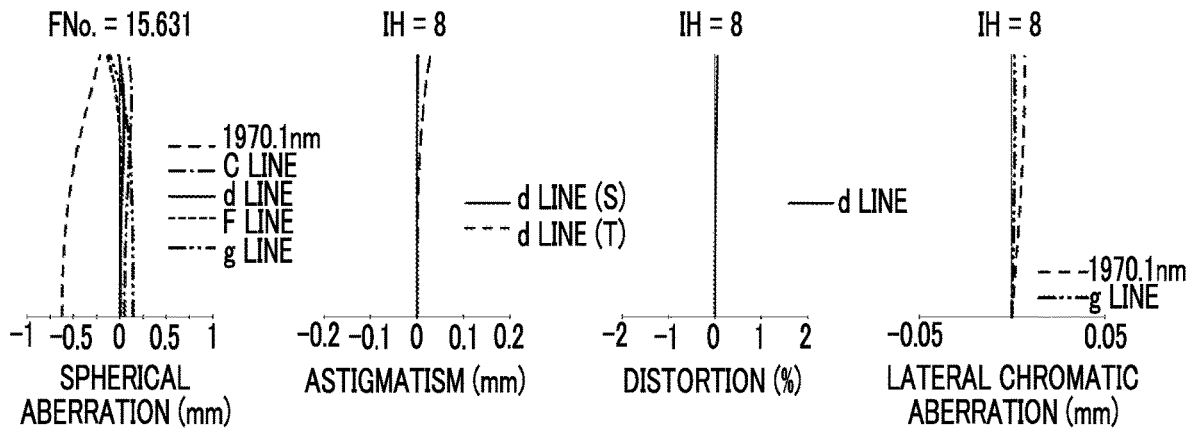

FIG. 16
EXAMPLE 6
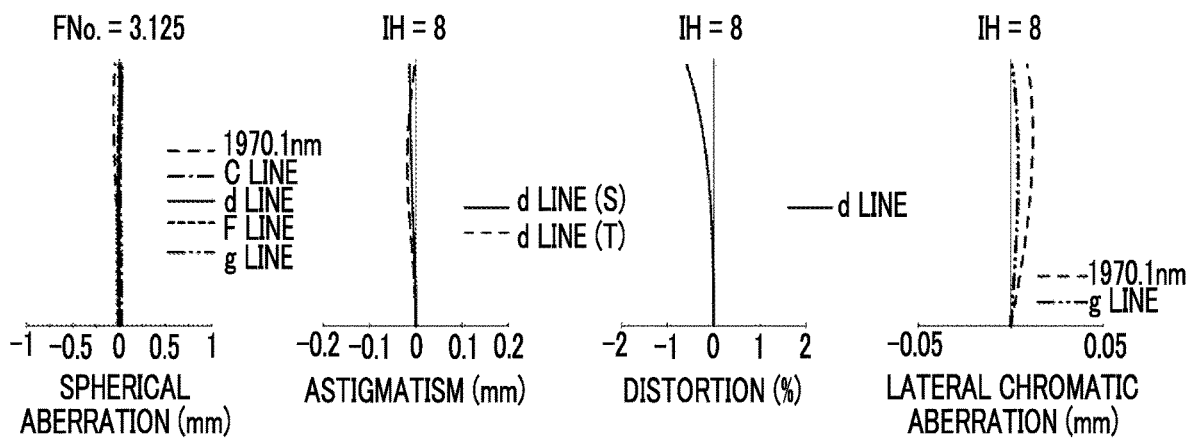
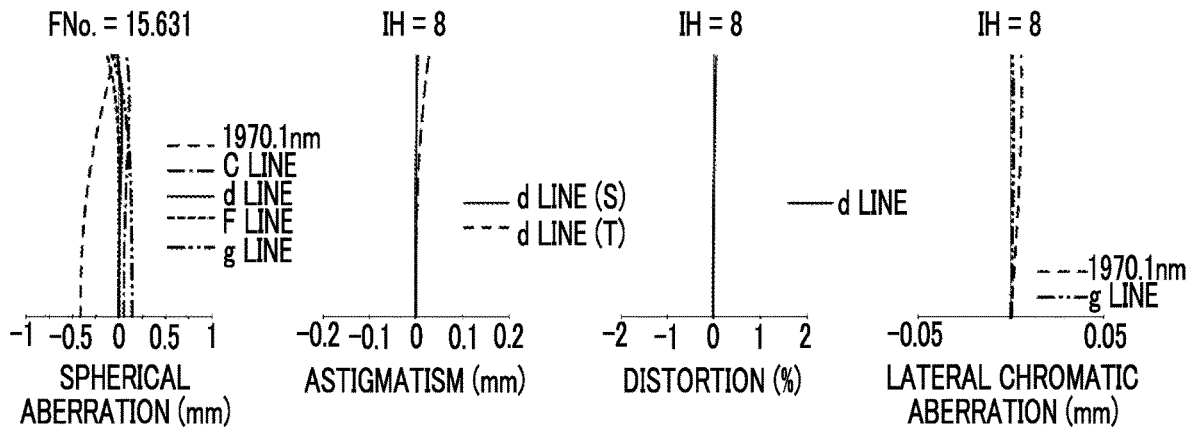

FIG. 17
EXAMPLE 7
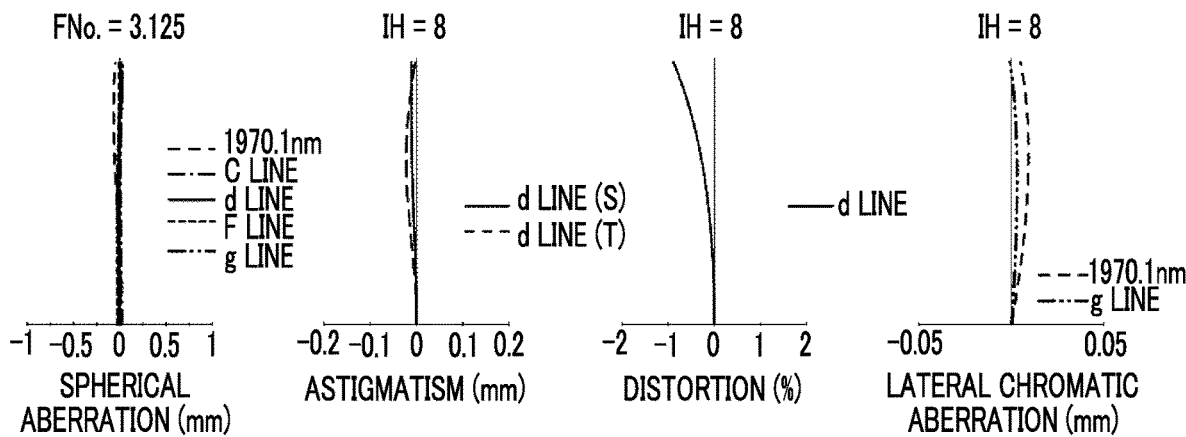
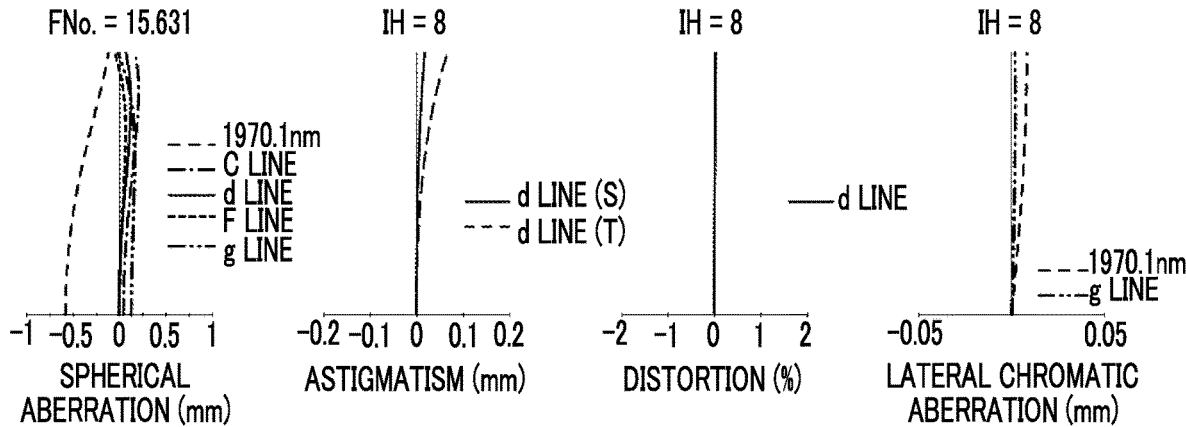

FIG. 18
EXAMPLE 8
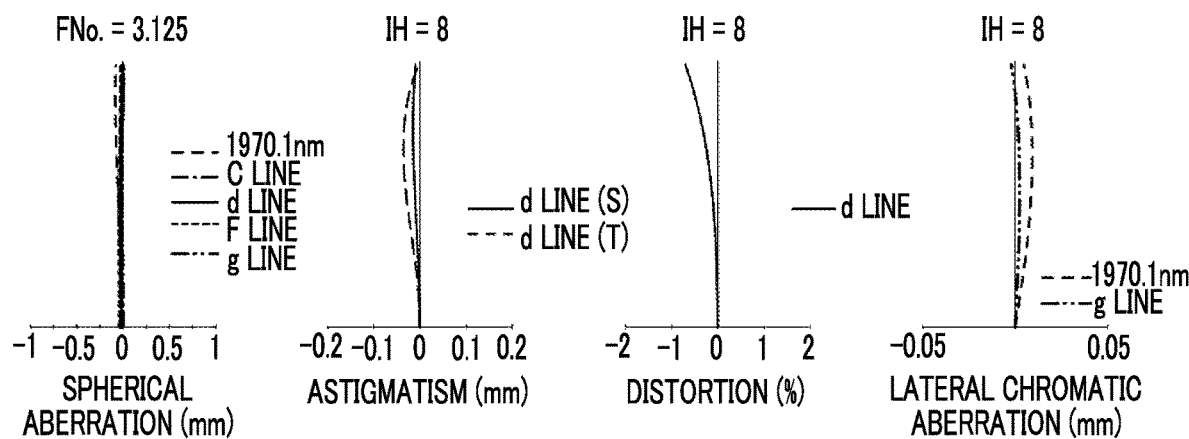
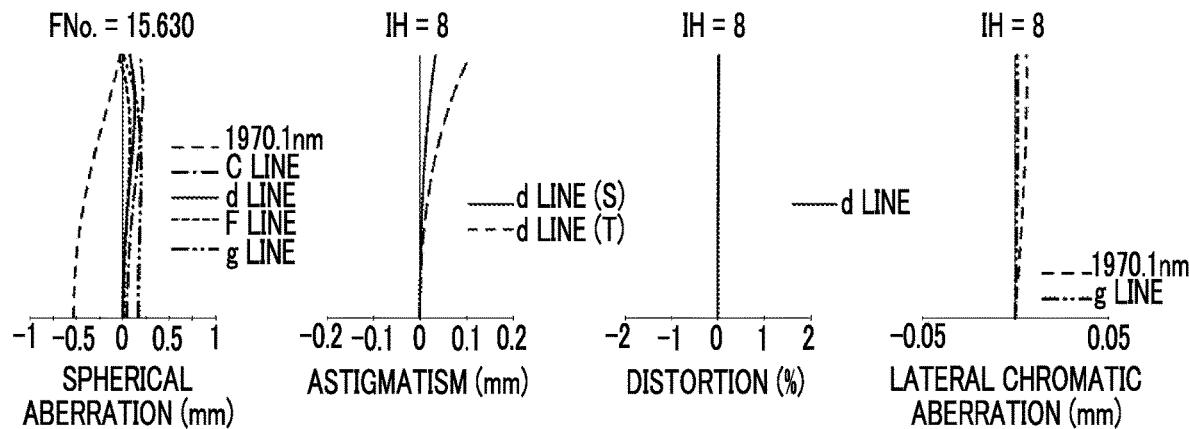

FIG. 19
EXAMPLE 9
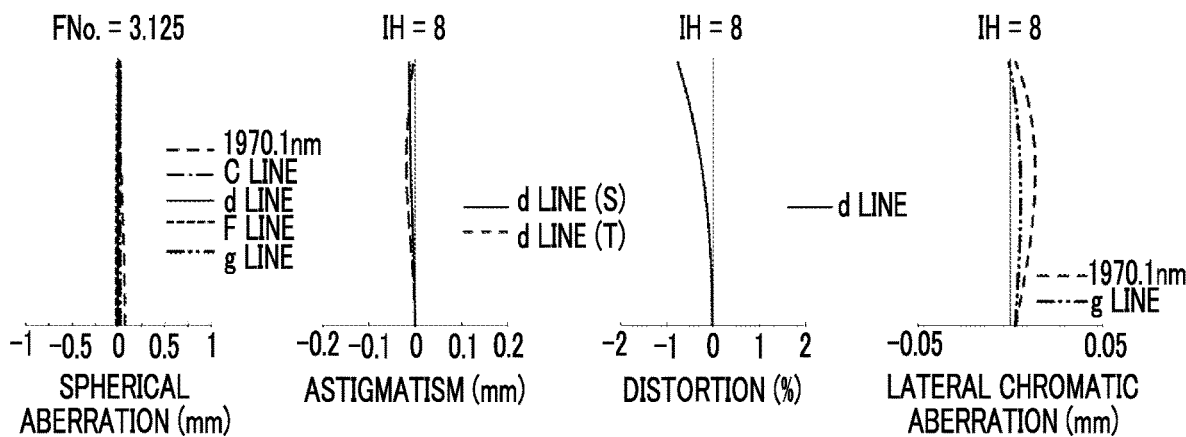
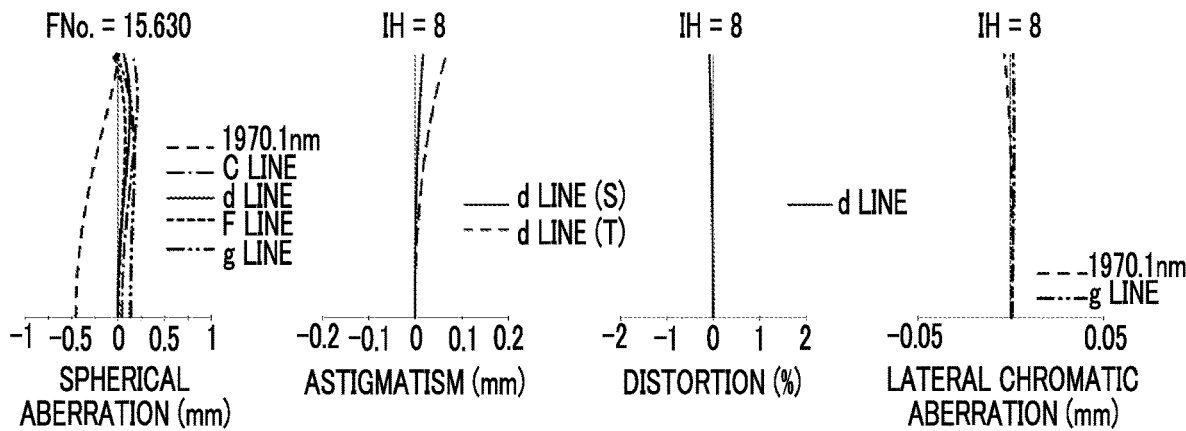

FIG. 20
EXAMPLE 10
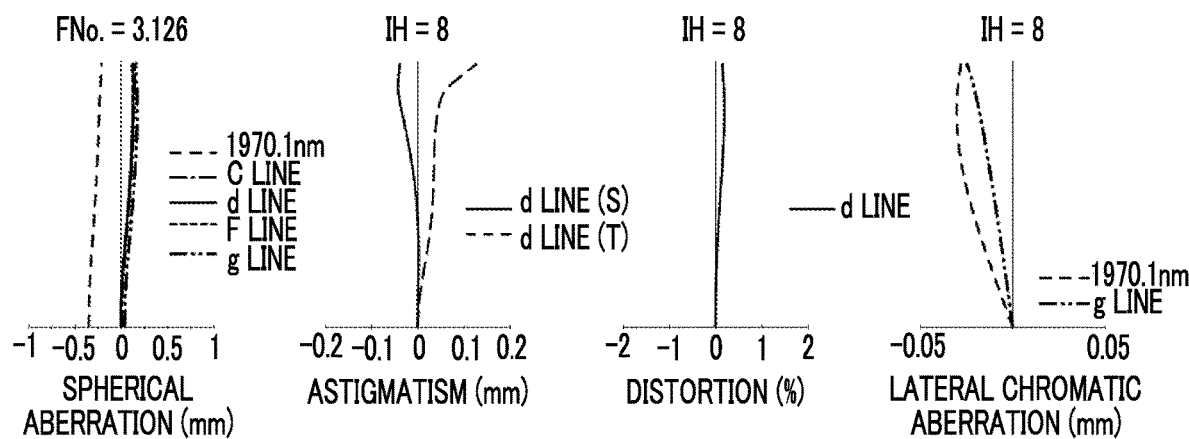
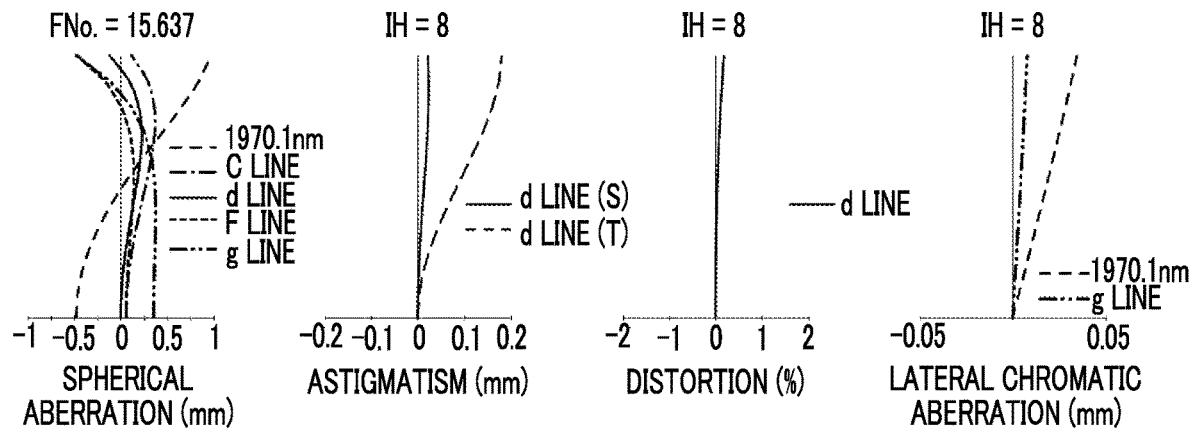

VARIABLE MAGNIFICATION OPTICAL SYSTEM AND IMAGING APPARATUS

CROSS-REFERENCE TO RELATED APPLICATIONS

The present application claims priority under 35 U.S.C. § 119 to Japanese Patent Application No. 2018-033717, filed on Feb. 27, 2018 and Japanese Patent Application No. 2018-243491, filed on Dec. 26, 2018, the contents of which are hereby expressly incorporated herein by reference in their entirety.

BACKGROUND OF THE INVENTION

1. Field of the Invention

The present invention relates to a variable magnification optical system and an imaging apparatus.

2. Description of the Related Art

In the related art, variable magnification optical systems comprising catadioptric systems have been proposed. For example, variable magnification optical systems each including two mirrors and a plurality of lenses are described in JP1999-202208A (JP-H11-202208A), U.S. Pat. Nos. 4,235,508A, 4,971,428A, and CN106772963A.

SUMMARY OF THE INVENTION

In recent years, the demand for surveillance cameras used for remote monitoring at harbors and/or airports and the like has increased. Accordingly, the demand for variable magnification optical systems of the telephoto system and the super telephoto system usable for such surveillance cameras has increased. In such a variable magnification optical system, it is desired that fluctuations in spherical aberration, astigmatism, distortion, and chromatic aberration during changing magnification are small while achieving a high variable magnification ratio, and favorable imaging performance is provided.

However, the variable magnification optical system described in JP1999-202208A (JP-H11-202208A) has large fluctuations in astigmatism and distortion during changing magnification. The variable magnification optical system described in U.S. Pat. No. 4,235,508A has a low variable magnification ratio. The variable magnification optical system described in U.S. Pat. No. 4,971,428A has large distortion. In the variable magnification optical system described in CN106772963A, spherical aberration is not satisfactorily corrected.

In view of the above situations, the present invention has an object to provide a variable magnification optical system, which has small fluctuations in various aberrations during changing magnification and has favorable optical performance while achieving a high variable magnification ratio, and an imaging apparatus comprising the variable magnification optical system.

In order to solve the above problem, the variable magnification optical system according to an embodiment of the present invention consists of, in order from an object side: a first optical system that includes two reflecting mirrors having reflective surfaces arranged to face each other and remains stationary with respect to an image plane during changing magnification; and a second optical system that includes at least two positive lenses and at least one negative lens. The two reflecting mirrors consist of a first reflecting mirror that has a reflective surface concave toward the object side and reflects light, which is originated from an object, toward the object side, and a second reflecting mirror that has a reflective surface convex toward an image side and reflects the reflected light, which is reflected from the first reflecting mirror, toward the image side. The second optical system includes, successively in order from a position closest to the object side, a first lens group that consistently moves to the object side during changing magnification from a wide-angle end to a telephoto end and has a positive refractive power, and a second lens group that moves in a direction of an optical axis with a locus different from a locus of the first lens group during changing magnification and has a positive refractive power. An intermediate image is formed between the second reflecting mirror and the first lens group, and the intermediate image is re-formed through the second optical system. In addition, assuming that an average value of partial dispersion ratios of all the positive lenses in the second optical system between a g line and an F line is θgFp, and an average value of partial dispersion ratios of all the negative lenses in the second optical system between the g line and the F line is θgFn, it is preferable to satisfy Conditional Expression (1).

$$-0.04 < \theta gFp - \theta gFn < 0.1 \tag{1}$$

In the variable magnification optical system of the present invention, it is preferable to satisfy Conditional Expression (1-1).

$$-0.02 < \theta gFp - \theta gFn < 0.06 \tag{1-1}$$

In the variable magnification optical system of the present invention, assuming that an average value of Abbe numbers of all the positive lenses in the second optical system at a d line is νdp and an average value of Abbe numbers of all the negative lenses in the second optical system at the d line is νdn, it is preferable to satisfy Conditional Expression (2), and it is more preferable to satisfy Conditional Expression (2-1).

$$10 < \nu dp - \nu dn < 40 \tag{2}$$

$$14 < \nu dp - \nu dn < 35 \tag{2-1}$$

In the variable magnification optical system of the present invention, assuming that an average value of partial dispersion ratios of all the positive lenses in the second optical system between a C line and a t line is θCtp and an average value of the partial dispersion ratios of all the negative lenses in the second optical system between the C line and the t line is θCtn, it is preferable to satisfy Conditional Expression (3), and it is more preferable to satisfy Conditional Expression (3-1).

$$-0.1 < \theta Ctp - \theta Ctn < 0.1 \tag{3}$$

$$-0.07 < \theta Ctp - \theta Ctn < 0.05 \tag{3-1}$$

In the variable magnification optical system of the present invention, it is preferable that the first optical system includes a field lens group that consists of two or less lenses and that has a positive refractive power and that is a lens component closest to the intermediate image.

In the variable magnification optical system of the present invention, it is preferable that the first reflecting mirror is an optical element having a power at a position closest to the object side on an optical path.

In the variable magnification optical system according to the present invention, it is preferable that the first optical system includes a correction lens group consisting of two or less lenses which are disposed in an optical path from the first reflecting mirror to the second reflecting mirror and in an optical path from the second reflecting mirror to a position of the intermediate image and which have a common optical axis with respect to the first reflecting mirror and the second reflecting mirror.

In the variable magnification optical system of the present invention, assuming that an average value of the partial dispersion ratios of all the negative lenses in the second optical system between a C line and a t line is θCtn, it is preferable to satisfy Conditional Expression (4), and it is more preferable to satisfy Conditional Expression (4-1).

$$0.75<\theta Ctn<0.9 \quad (4)$$

$$0.77<\theta Ctn<0.85 \quad (4\text{-}1)$$

In the variable magnification optical system of the present invention, assuming that an average value of the partial dispersion ratios of all the positive lenses in the second optical system between the C line and the t line is θCtp, it is preferable to satisfy Conditional Expression (5), and it is more preferable to satisfy Conditional Expression (5-1).

$$0.75<\theta Ctp<0.9 \quad (5)$$

$$0.78<\theta Ctp<0.85 \quad (5\text{-}1)$$

In the variable magnification optical system of the present invention, assuming that an average value of Abbe numbers of all the negative lenses in the second optical system at a d line is vdn, it is preferable to satisfy Conditional Expression (6).

$$50<vdn<65 \quad (6)$$

In the variable magnification optical system of the present invention, assuming that an average value of refractive indices of all the negative lenses in the second optical system at a d line is Ndn, it is preferable to satisfy Conditional Expression (7).

$$1.5<Ndn<1.75 \quad (7)$$

In the variable magnification optical system of the present invention, assuming that an average value of partial dispersion ratios of all the negative lenses in the second optical system between the g line and the F line is θgFn, it is preferable to satisfy Conditional Expression (8).

$$0.53<\theta gFn<0.58 \quad (8)$$

In the variable magnification optical system of the present invention, assuming that an average value of partial dispersion ratios of all the positive lenses in the second optical system between a g line and an F line is θgFp, it is preferable to satisfy Conditional Expression (9).

$$0.5<\theta gFp<0.65 \quad (9)$$

In the variable magnification optical system of the present invention, assuming that an average value of Abbe numbers of all the positive lenses in the second optical system at a d line is vdp, it is preferable to satisfy Conditional Expression (10).

$$70<vdp<100 \quad (10)$$

In the variable magnification optical system of the present invention, assuming that an average value of refractive indices of all the positive lenses in the second optical system at a d line is Ndp, it is preferable to satisfy Conditional Expression (11).

$$1.43<Ndp<1.75 \quad (11)$$

An imaging apparatus of the present invention comprises the variable magnification optical system of the present invention.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, it should be noted that the "~ group having a positive refractive power" means that the group has a positive refractive power as a whole. Likewise, the "~ group having a negative refractive power" means that the group has a negative refractive power as a whole. "A lens having a positive refractive power", "a lens having a positive power", and "a positive lens" are synonymous. "A lens having a negative refractive power", "a lens having a negative power", and "a negative lens" are synonymous. The "lens group" is not limited to a configuration using a plurality of lenses, but may consist of only one lens. The "single lens" means one uncemented lens. However, a compound aspheric lens (a lens which is integrally composed of a spherical lens and a film having an aspheric shape formed on the spherical lens, and functions as one aspheric lens as a whole) is not be considered as a cemented lens, and is treated as a single lens. The "lens component" means a lens of which air contact surfaces are two surfaces including an object side surface and an image side surface on the optical axis, and one lens component means one single lens or a group of cemented lenses. The "having a power" means that a reciprocal of the focal length is not zero. The signs of the refractive powers, the surface shapes, and the radii of curvature of the surfaces of an optical element including an aspheric surface are assumed as those in the paraxial region unless otherwise specified. The sign of the radius of curvature of the surface convex toward the object side is positive and the sign of the radius of curvature of the surface convex toward the image side is negative. The "focal length" used in a conditional expression is a paraxial focal length. The values of conditional expressions other than conditional expressions relating to the partial dispersion ratio are values in the case of using the d line as a reference in a state where the object at infinity is in focus.

The "d line", "C line", "F line", "g line", and "t line" described in this specification are emissions lines. In the present specification, it is assumed that the wavelength of d line is 587.56 nm (nanometers), the wavelength of C line is 656.27 nm (nanometers), the wavelength of F line is 486.13 nm (nanometers), the wavelength of g line is 435.84 nm (nanometers), and the wavelength of t line is 1013.98 nm (nanometers).

The partial dispersion ratio θgF between the g line and the F line of a certain lens is defined by θgF=(Ng−NF)/(NF−NC), where Ng, NF, and NC are the refractive indices of the lens at the g line, the F line, and the C line. The partial dispersion ratio θCt between the C line and the t line of a certain lens is defined by θCt=(NC−Nt)/(NF−NC), where Nt, NF, and NC are the refractive indices of the lens at the t line, the F line, and the C line.

According to the present invention, it is possible to provide a variable magnification optical system, which has small fluctuations in various aberrations during changing magnification and has favorable optical performance while achieving a high variable magnification ratio, and an imaging apparatus comprising the variable magnification optical system.

BRIEF DESCRIPTION OF THE DRAWINGS

FIG. 11 is a diagram of aberrations of the variable magnification optical system according to Example 1 of the present invention.

FIG. 12 is a diagram of aberrations of the variable magnification optical system according to Example 2 of the present invention.

FIG. 13 is a diagram of aberrations of the variable magnification optical system according to Example 3 of the present invention.

FIG. 14 is a diagram of aberrations of the variable magnification optical system according to Example 4 of the present invention.

FIG. 15 is a diagram of aberrations of the variable magnification optical system according to Example 5 of the present invention.

FIG. 16 is a diagram of aberrations of the variable magnification optical system according to Example 6 of the present invention.

FIG. 17 is a diagram of aberrations of the variable magnification optical system according to Example 7 of the present invention.

FIG. 18 is a diagram of aberrations of the variable magnification optical system according to Example 8 of the present invention.

FIG. 19 is a diagram of aberrations of the variable magnification optical system according to Example 9 of the present invention.

FIG. 20 is a diagram of aberrations of the variable magnification optical system according to Example 10 of the present invention.

DESCRIPTION OF THE PREFERRED EMBODIMENTS

Figure 1:
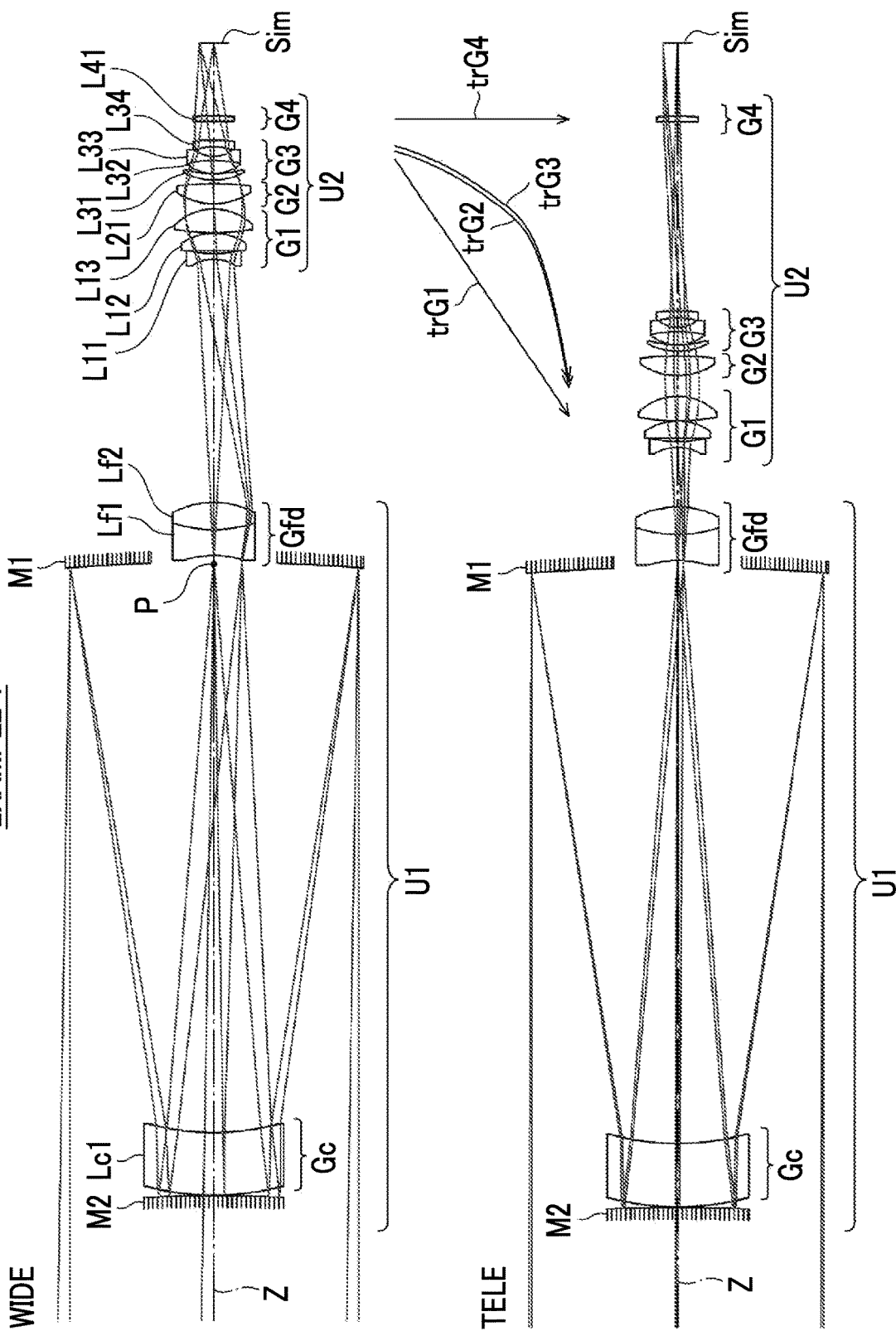
FIG. 1 is a cross-sectional view illustrating a configuration and an optical path of a variable magnification optical system (variable magnification optical system of Example 1 of the present invention) according to an embodiment of the present invention at a wide-angle end and a telephoto end.

Hereinafter, embodiments of the present invention will be described in detail with reference to the drawings. FIG. 1 is a cross-sectional view illustrating a configuration and an optical path of a variable magnification optical system according to an embodiment of the present invention. In FIG. 1, aberrations at the wide-angle end state are shown in the upper part indicated by "WIDE", and aberrations at the telephoto end state are shown in the lower part indicated by "TELE". The example shown in FIG. 1 corresponds to the variable magnification optical system of Example 1 to be described later. FIG. 1 shows a state where the object at infinity is in focus, where the left side of the drawing is the object side and the right side of the drawing is the image side.

The variable magnification optical system according to the present embodiment consists of, in order from the object side to the image side, a first optical system U1 and a second optical system U2. The first optical system U1 remains stationary with respect to an image plane Sim during changing magnification. The second optical system U2 includes at least two positive lenses and at least one negative lens.

The first optical system U1 includes two reflecting mirrors having reflective surfaces arranged to face each other. According to this configuration, it is possible to shorten the total length by folding the optical path. The two reflecting mirrors consist of a first reflecting mirror and a second reflecting mirror. The first mirror M1 of the present embodiment corresponds to the first reflecting mirror, and the second mirror M2 corresponds to the second reflecting mirror.

It is preferable that the first mirror M1 is an optical element having a power at a position closest to the object side in the optical path. In a case where a dioptric system is disposed to be closer to the object side than the first mirror M1 in the optical path, the dioptric system requires a large aperture, which is expensive. Further, in a case where the dioptric system is disposed to be closer to the object side than the first mirror M1 in the optical path, the center of gravity of the variable magnification optical system is biased toward the tip portion, and the weight balance thereof is deteriorated. Thus, this configuration is not preferable. Furthermore, since light does not pass through a reflective optical element, there is also an advantage that the degree of freedom of selection of a material is higher than that of a transmissive optical element.

The first mirror M1 has a reflective surface concave toward the object side and is configured to reflect light, which is originated from the object, toward the object side.

The second mirror M2 has a reflective surface convex toward the image side and is configured to reflect the reflected light, which is reflected from the first mirror M1, toward the image side. With such a configuration, it is possible to shorten the total length without generating chromatic aberration, and thus the optical system becomes suitable for a super telephoto system. As an example, FIG. 1 shows an example in which the first mirror M1 and the second mirror M2 are configured to have a common optical axis Z.

The reflective surface of the first mirror M1 and the reflective surface of the second mirror M2 are preferably spherical. In such a case, the optical system can be manufactured inexpensively, and it is possible to reduce deterioration in image quality caused by eccentricity and/or collapse.

The second optical system U2 includes, in order from a position closest to the object side, a first lens group G1 that consistently moves to the object side during changing magnification from a wide-angle end to a telephoto end and has a positive refractive power, and a second lens group G2 that moves in a direction of an optical axis with a locus different from a locus of the first lens group G1 during changing magnification and has a positive refractive power. In other words, the first lens group G1 is disposed to be closest to the object side in the second optical system U2, and the second lens group G2 is disposed adjacent to the first lens group G1 on the image side in the first lens group G1. The plurality of lens groups having positive refractive powers are continuously arranged in the second optical system U2 which is a variable magnification optical system. Thereby, it is possible to suppress occurrence of spherical aberration on the wide-angle side, fluctuation in spherical aberration during changing magnification, fluctuation in astigmatism during changing magnification, and fluctuation in distortion during changing magnification. As, a result, a high variable magnification ratio can be easily achieved. In addition, it is possible to reduce the effective diameter of the lens group that moves during changing magnification.

An intermediate image is formed between the second mirror M2 and the first lens group G1. FIG. 1 shows a position P of the intermediate image in the optical axis. The intermediate image is re-formed on the image plane Sim through the second optical system U2. That is, the second optical system U2 functions as a relay optical system. By using the variable magnification optical system as a reimaging optical system, it is possible to reduce the diameter of the lens group moving during changing magnification, and it is possible to achieve reduction in weight and an increase in speed of the changing magnification operation.

The first optical system U1 may be configured to include a field lens group Gfd which is a lens component closest to the intermediate image. It should be noted that the "intermediate image" in the term "closest to the intermediate image" described herein is an intermediate image during focusing on the object at infinity. Further, the "field lens group Gfd closest to the intermediate image" also includes a case where the position P of the intermediate image is located inside the field lens group Gfd. It is preferable that the field lens group Gfd is a lens group that consists of two or less lenses and has a positive refractive power. By providing a positive refractive power in the vicinity of the intermediate image, it is possible to make the light of the peripheral angle of view intersect with the optical axis Z inside the variable magnification optical system. Thus, it is possible to suppress an increase in the effective diameter of the variable magnification optical system. For example, the field lens group Gfd in the example of FIG. 1 consists of a set of cemented lenses formed by cementing a lens Lf1 having a negative power and a lens Lf2 having a positive power in order from the object side. The lens Lf1 is concave toward the object side, the lens Lf2 is convex toward the image side, and the cemented surface between the lens Lf1 and the lens Lf2 is convex toward the object side.

In addition, the first optical system U1 may be configured to include the correction lens group Gc having the effect of aberration correction. The correction lens group Gc preferably consists of two or less lenses having the common optical axis Z with respect to the first mirror M1 and the second mirror M2. By setting the number to two or less, the load on the object side portion of the variable magnification optical system can be minimized. As a result, the solidity required for the mount for installing the variable magnification optical system can be reduced. In order to reduce the number of optical elements to be used and to improve manufacturability, it is preferable that the correction lens group Gc consists of one lens. The correction lens group Gc in the example of FIG. 1 consists of only one lens Lc1. For example, the lens Lc1 in FIG. 1 is a meniscus lens convex toward the object side. It should be noted that the correction lens group Gc may consist of two lenses, and in such a case, astigmatism can be satisfactorily corrected. For example, the correction lens group Gc may consist of two single lenses having a meniscus shape convex toward the object side.

It is preferable that the correction lens group Gc be disposed both in the optical path from the first mirror M1 to the second mirror M2 and in the optical path from the second mirror M2 to the position P of the intermediate image. That is, it is preferable to adopt a configuration in which the light passes the correction lens group Gc twice in a case where the light reflected by the first mirror M1 is directed toward the second mirror M2 and in a case where the light reflected by the second mirror M2 is directed to the position P of the intermediate image. As described above, the correction lens group Gc is disposed in the optical path in which the light reciprocates. Thereby, even in a case where the number of optical elements such as lenses and mirrors is reduced, it becomes easy to satisfactorily correct spherical aberration. In addition, even in a case where the number of optical elements is reduced and both the first mirror M1 and the second mirror M2 do not use an aspheric surface, it becomes easy to satisfactorily correct spherical aberration.

It is preferable that only the first mirror M1, the second mirror M2, the field lens group Gfd, and the correction lens group Gc are optical elements having powers included in the first optical system U1. Deterioration in the transmittance of the entire first optical system U1 can be suppressed by reducing the number of optical elements.

In the example of FIG. 1, the first optical system U1 has only a first mirror M1, a second mirror M2, a field lens group Gfd, and a correction lens group Gc as optical elements having powers. In the example of FIG. 1, all the optical elements of the first optical system U1 have a common optical axis Z. Regarding arrangement in which the optical path is not considered, the second mirror M2 is located closest to the object side, the correction lens group Gc is disposed near the image side of the second mirror M2, the first mirror M1 is disposed closer to the image side than the correction lens group Gc, and the field lens group Gfd is disposed near the first mirror M1. In the example of FIG. 1, the first mirror M1 has an annular shape of which the center is hollow. The intermediate image is located near the object side of the field lens group Gfd.

In the example of FIG. 1, light incident into the first optical system U1 along the optical path from the object side to the image side is first reflected by the first mirror M1, travels toward the object side, and is transmitted through the correction lens group Gc. Then, the light is reflected by the second mirror M2, travels toward the image side, is transmitted through the correction lens group Gc again, is transmitted through the field lens group Gfd, and is incident into the second optical system U2.

The second optical system U2 in the example of FIG. 1 consists of, in order from the object side to the image side along the optical axis Z, a first lens group G1, a second lens group G2, a third lens group G3, and a fourth lens group G4. In the example of FIG. 1, the first lens group G1 consists of three lenses L11 to L13, the second lens group G2 consists of one lens L21, the third lens group G3 consists of four lenses L31 to L34, and the fourth lens group G4 consists of one lens L41. However, the configuration shown in FIG. 1 is just an example. The variable magnification optical system may be configured such that the number of lens groups composing the second optical system U2 and the number of lenses composing each lens group are different from those in the example of FIG. 1.

In the example of FIG. 1, during changing magnification, the first lens group G1, the second lens group G2, and the third lens group G3 move by changing the distances between adjacent lens groups in the direction of the optical axis, and the fourth lens group G4 remains stationary with respect to the image plane Sim. That is, during changing magnification, the first lens group G1, the second lens group G2, and the third lens group G3 move in the direction of the optical axis with loci different from one another. In FIG. 1, during changing magnification from the wide-angle end to the telephoto end, the movement locus trG1 of the first lens group G1, the movement locus trG2 of the second lens group G2, the movement locus trG3 of the third lens group G3, and the movement locus trG4 of the fourth lens group G4 are schematically indicated by arrows between the wide-angle end state and the telephoto end state. The movement locus of the lens group that does not move during changing magnification as in the fourth lens group G4 is indicated by a straight arrow in the vertical direction.

It is preferable that the lens closest to the object side in the first lens group has a negative refractive power and is concave toward the object side. In such a case, the angle of the principal light of the off-axis light with respect to the optical axis Z can be reduced. As a result, it is possible to reduce fluctuations in the effective diameters of the lenses included in the first lens group G1 and the second lens group G2 during changing magnification.

It is preferable that the lens closest to the image side in the first lens group G1 and the lens closest to the object side in the second lens group G2 have positive refractive powers and are convex toward each other. In such a case, fluctuation in spherical aberration during changing magnification can be suppressed.

It is preferable that the second optical system U2 includes at least one lens group at the position closer to the image side than the second lens group G2, and the lens group closest to the image side in the second optical system U2 has a positive refractive power. In such a case, there is an advantage in correction of lateral chromatic aberration. The lens group closest to the image side in the second optical system U2 may be composed of one single lens. In such a case, it is possible to ensure the amounts of movement of the first lens group G1 and the second lens group G2. As a result, there is an advantage in achieving a high variable magnification ratio while suppressing fluctuations in various aberrations.

For example, as in the example shown in FIG. 1, the second optical system U2 consists of, in order from the object side, a first lens group G1 having a positive refractive power, a second lens group G2 having a positive refractive power, a third lens group G3 having a negative refractive power, and a fourth lens group G4 having a positive refractive power. During changing magnification, the first lens group G1, the second lens group G2, the third lens group G3 move in the direction of the optical axis with loci different from one another, and the fourth lens group G4 remains stationary with respect to the image plane Sim. In such a case, fluctuation in astigmatism during changing magnification can be suppressed.

Alternatively, as in Example 7 described later, the second optical system U2 may consist of, in order from the object side, a first lens group G1 having a positive refractive power, a second lens group G2 having a positive refractive power, and a third lens group G3 having a positive refractive power. During changing magnification, the first lens group G1 and the second lens group G2 may move in the direction of the optical axis with loci different from one another, and the third lens group G3 may remain stationary with respect to the image plane Sim. In such a case, since all the lens groups composing the second optical system U2 have positive refractive powers, it is possible to suppress deterioration in image quality caused by eccentricity and/or collapse of the lens groups while suppressing fluctuation in spherical aberration during changing magnification.

Alternatively, as in Example 9 to be described later, the second optical system U2 may consist of, in order from the object side, a first lens group G1 having a positive refractive power, a second lens group G2 having a positive refractive power, and a third lens group G3 having a positive refractive power. During changing magnification, the first lens group G1, the second lens group G2, and the third lens group G3 may move in the direction of the optical axis with loci different from one another. In such a case, all the lens groups composing the second optical system U2 have positive refractive powers, and the degree of freedom of the paraxial solution increases. Thus, it is possible to suppress deterioration in image quality caused by eccentricity and/or collapse of lens groups while suppressing fluctuation in spherical aberration during changing magnification and fluctuation in astigmatism during changing magnification.

Alternatively, as in Example 10 described later, the second optical system U2 may consist of, in order from the object side, a first lens group G1 having a positive refractive power and a second lens group G2 having a positive refractive power. The first lens group G1 and the second lens group G2 may move in the direction of the optical axis with loci different from one another during changing magnification. In such a case, since the configuration is simple, the changing magnification mechanism can be simplified.

Regarding focusing, for example, it is possible to perform focusing by changing a distance between the first mirror M1 and the second mirror M2. In that case, it is preferable to adopt any one of the following methods: a method of performing focusing by moving only the first mirror M1 in the direction of the optical axis with respect to the image plane Sim; a method of performing focusing by moving only the second mirror M2 in the direction of the optical axis with respect to the image plane Sim; and a method of performing focusing by integrally moving the second mirror M2 and the correction lens group Gc in the direction of the optical axis.

Alternatively, focusing may be performed by moving a part of the lens groups of the second optical system U2 in the direction of the optical axis.

Next, a configuration relating to conditional expressions of the variable magnification optical system of the present embodiment will be described. Assuming that an average value of the partial dispersion ratios of all the positive lenses in the second optical system U2 between the g line and the F line is θgFp and an average value of the partial dispersion ratio of all the negative lenses in the second optical system U2 between the g line and the F line is θgFn, it is preferable that the variable magnification optical system of the present embodiment satisfies Conditional Expression (1). By satisfying Conditional Expression (1), occurrence of secondary longitudinal chromatic aberration and secondary lateral chromatic aberration in the visible light region can be suppressed. In addition, in a case of a configuration in which Conditional Expression (1-1) is satisfied, it is possible to obtain more favorable characteristics. In a case of a configuration in which Conditional Expression (1-2) is satisfied, it is possible to obtain further more favorable characteristics.

$$-0.04 < \theta gFp - \theta gFn < 0.1 \quad (1)$$

$$-0.02 < \theta gFp - \theta gFn < 0.06 \quad (1\text{-}1)$$

$$-0.015 < \theta gFp - \theta gFn < 0 \quad (1\text{-}2)$$

Assuming that an average value of the Abbe numbers of all the positive lenses in the second optical system U2 at the d line is vdp and an average value of the Abbe numbers of all the negative lenses in the second optical system U2 at the d line is vdn, it is preferable to satisfy Conditional Expression (2). By not allowing the result of Conditional Expression (2) to be equal to or less than the lower limit, correction of longitudinal chromatic aberration becomes easy. By not allowing the result of Conditional Expression (2) to be equal to or greater than the upper limit, occurrence of secondary chromatic aberration can be suppressed. In addition, in a case of a configuration in which Conditional Expression (2-1) is satisfied, it is possible to obtain more favorable characteristics.

$$10 < vdp - vdn < 40 \quad (2)$$

$$14 < vdp - vdn < 35 \quad (2\text{-}1)$$

Assuming that an average value of the partial dispersion ratios of all the positive lenses in the second optical system U2 between the C line and the t line is θCtp and an average value of the partial dispersion ratio of all the negative lenses in the second optical system U2 between the C line and the t line is θCtn, it is preferable to satisfy Conditional Expression (3). By satisfying Conditional Expression (3), occurrence of secondary chromatic aberration in the wavelength range from red to infrared can be suppressed. In addition, in a case of a configuration in which Conditional Expression (3-1) is satisfied, it is possible to obtain more favorable characteristics. In a case of a configuration in which Conditional Expression (3-2) is satisfied, it is possible to obtain further more favorable characteristics.

$$-0.1 < \theta Ctp - \theta Ctn < 0.1 \quad (3)$$

$$-0.07 < \theta Ctp - \theta Ctn < 0.05 \quad (3\text{-}1)$$

$$-0.06 < \theta Ctp - \theta Ctn < 0.015 \quad (3\text{-}2)$$

Assuming that an average value of the partial dispersion ratios of all the negative lenses in the second optical system U2 between the C line and the t line is θCtn, it is preferable to satisfy Conditional Expression (4). By not allowing the result of Conditional Expression (4) to be equal to or less than the lower limit, it becomes easy to ensure a difference in Abbe number between the negative lens and the positive lens, and it becomes easy to correct the primary chromatic aberration. By not allowing the result of Conditional Expression (4) to be equal to or greater than the upper limit, it becomes easy to correct the secondary chromatic aberration in the wavelength range from red to infrared. In addition, in a case of a configuration in which Conditional Expression (4-1) is satisfied, it is possible to obtain more favorable characteristics.

$$0.75 < \theta Ctn < 0.9 \quad (4)$$

$$0.77 < \theta Ctn < 0.85 \quad (4\text{-}1)$$

Assuming that an average value of the partial dispersion ratios of all the positive lenses in the second optical system U2 between the C line and the t line is θCtp, it is preferable to satisfy Conditional Expression (5). By not allowing the result of Conditional Expression (5) to be equal to or less than the lower limit, it becomes easy to correct the secondary chromatic aberration in the wavelength range from red to infrared. By not allowing the result of Conditional Expression (5) to be equal to or greater than the upper limit, it becomes easy to ensure a difference in Abbe number between the negative lens and the positive lens, and it becomes easy to correct the primary chromatic aberration. In addition, in a case of a configuration in which Conditional Expression (5-1) is satisfied, it is possible to obtain more favorable characteristics.

$$0.75 < \theta Ctp < 0.9 \quad (5)$$

$$0.78 < \theta Ctp < 0.85 \quad (5\text{-}1)$$

Assuming that an average value of the Abbe numbers of all the negative lenses in the second optical system U2 at the d line is vdn, it is preferable to satisfy Conditional Expression (6). By not allowing the result of Conditional Expression (6) to be equal to or less than the lower limit, it becomes easy to select a material having a small partial dispersion ratio between the g line and the F line, and it becomes easy to correct the secondary chromatic aberration in the visible light region. By not allowing the result of Conditional Expression (6) to be equal to or greater than the upper limit, it becomes easy to ensure a difference in Abbe number between the negative lens and the positive lens, and it becomes easy to correct the primary chromatic aberration. In addition, in a case of a configuration in which Conditional Expression (6-1) is satisfied, it is possible to obtain more favorable characteristics.

$$50 < vdn < 65 \quad (6)$$

$$52 < vdn < 60 \quad (6\text{-}1)$$

Assuming that an average value of the refractive indices of all the negative lenses in the second optical system U2 at the d line is Ndn, it is preferable to satisfy Conditional Expression (7). By not allowing the result of Conditional Expression (7) to be equal to or less than the lower limit, occurrence of higher order spherical aberration can be suppressed, and a material with a small Abbe number can be easily selected. As a result, there is an advantage in correction of primary chromatic aberration. By not allowing the result of Conditional Expression (7) to be equal to or greater than the upper limit, the absolute value of the Petzval sum can be minimized, and the field curvature can be corrected well. In addition, in a case of a configuration in which Conditional Expression (7-1) is satisfied, it is possible to obtain more favorable characteristics. In a case of a configuration in which Conditional Expression (7-2) is satisfied, it is possible to obtain further more favorable characteristics.

$$1.5 < Ndn < 1.75 \quad (7)$$

$$1.55 < Ndn < 1.7 \quad (7\text{-}1)$$

$$1.57 < Ndn < 1.65 \quad (7\text{-}2)$$

Assuming that an average value of the partial dispersion ratios of all the negative lenses in the second optical system between the g line and the F line U2 is θgFn, it is preferable to satisfy Conditional Expression (8). By not allowing the result of Conditional Expression (8) to be equal to or less than the lower limit, it becomes easy to ensure a difference in Abbe number between the negative lens and the positive lens, and it becomes easy to correct the primary chromatic aberration. By not allowing the result of Conditional Expression (8) to be equal to or greater than the upper limit, it becomes easy to correct the secondary chromatic aberration in the visible light region. In addition, in a case of a configuration in which Conditional Expression (8-1) is satisfied, it is possible to obtain more favorable characteristics.

$$0.53 < \theta gFn < 0.58 \quad (8)$$

$$0.535 < \theta gFn < 0.565 \quad (8\text{-}1)$$

Assuming that an average value of the partial dispersion ratios of all the positive lenses in the second optical system U2 between the g line and the F line is θgFp, it is preferable to satisfy Conditional Expression (9). By not allowing the result of Conditional Expression (9) to be equal to or less than the lower limit, it becomes easy to correct the secondary chromatic aberration in the visible light region. By not allowing the result of Conditional Expression (9) to be equal to or greater than the upper limit, it becomes easy to ensure a difference in Abbe number between the negative lens and the positive lens, and it becomes easy to correct the primary chromatic aberration. In addition, in a case of a configuration in which Conditional Expression (9-1) is satisfied, it is possible to obtain more favorable characteristics.

$$0.5 < \theta gFp < 0.65 \quad (9)$$

$$0.52 < \theta gFp < 0.6 \quad (9\text{-}1)$$

Assuming that an average value of the Abbe numbers of all the positive lenses in the second optical system U2 at the d line is νdp, it is preferable to satisfy Conditional Expression (10). By not allowing the result of Conditional Expression (10) to be equal to or less than the lower limit, it becomes easy to ensure a difference in Abbe number between the negative lens and the positive lens, and it becomes easy to correct the primary chromatic aberration. By not allowing the result of Conditional Expression (10) to be equal to or greater than the upper limit, it becomes easy to select a material having a large partial dispersion ratio between the g line and the F line, and it becomes easy to correct the secondary chromatic aberration in the visible light region. In addition, in a case of a configuration in which Conditional Expression (10-1) is satisfied, it is possible to obtain more favorable characteristics.

$$70 < \nu dp < 100 \quad (10)$$

$$72 < \nu dp < 90 \quad (10\text{-}1)$$

Assuming that an average value of the refractive indices of all the positive lenses in the second optical system U2 at the d line is Ndp, it is preferable to satisfy Conditional Expression (11). By not allowing the result of Conditional Expression (11) to be equal to or less than the lower limit, the absolute value of the Petzval's sum can be suppressed small while suppressing occurrence of spherical aberration, and field curvature can be corrected well. By not allowing the result of Conditional Expression (11) to be equal to or greater than the upper limit, it becomes easy to select a material having a large Abbe number. As a result, there is an advantage in correction of primary chromatic aberration. In addition, in a case of a configuration in which Conditional Expression (11-1) is satisfied, it is possible to obtain more favorable characteristics.

$$1.43 < Ndp < 1.75 \quad (11)$$

$$1.44 < Ndp < 1.55 \quad (11\text{-}1)$$

Assuming that a focal length of the second optical system U2 at the telephoto end is fU2 and a focal length of the first lens group G1 is fG1, it is preferable to satisfy Conditional Expression (12). By not allowing the result of Conditional Expression (12) to be equal to or less than the lower limit, it is possible to achieve a high variable magnification ratio even in a case where the amount of movement of the first lens group G1 during changing magnification is reduced. By not allowing the result of Conditional Expression (12) to be equal to or greater than the upper limit, fluctuation in spherical aberration during changing magnification can be suppressed. In addition, in a case of a configuration in which Conditional Expression (12-1) is satisfied, it is possible to obtain more favorable characteristics.

$$0.2 < fU2/fG1 < 0.45 \quad (12)$$

$$0.22 < fU2/fG1 < 0.4 \quad (12\text{-}1)$$

Assuming that a radius of curvature of the reflective surface of the first mirror is rM1 and a radius of curvature of the reflective surface of the second mirror is rM2, it is preferable to satisfy Conditional Expression (13). By not allowing the result of Conditional Expression (13) to be equal to or less than the lower limit, there is an advantage in shortening the total length. By not allowing the result of Conditional Expression (13) to be equal to or greater than the upper limit, it is possible to suppress occurrence of astigmatism. In addition, in a case of a configuration in which Conditional Expression (13-1) is satisfied, it is possible to obtain more favorable characteristics. In a case of a configuration in which Conditional Expression (13-2) is satisfied, it is possible to obtain further more favorable characteristics.

$$1 < rM1/rM2 < 2.5 \quad (13)$$

$$1.2 < rM1/rM2 < 2.2 \quad (13\text{-}1)$$

$$1.6 < rM1/rM2 < 2.1 \quad (13\text{-}2)$$

Assuming that a radius of curvature of the reflective surface of the first mirror is rM1 and a focal length of the correction lens group Gc is fC, it is preferable to satisfy Conditional Expression (14). By not allowing the result of Conditional Expression (14) to be equal to or less than the lower limit, there is an advantage in correction of spherical aberration. By not allowing the result of Conditional Expression (14) to be equal to or greater than the upper limit, longitudinal chromatic aberration can be suppressed and occurrence of difference in spherical aberration due to wavelength can be suppressed. In addition, in a case of a configuration in which Conditional Expression (14-1) is satisfied, it is possible to obtain more favorable characteristics. In a case of a configuration in which Conditional Expression (14-2) is satisfied, it is possible to obtain further more favorable characteristics.

$$0.07 < rM1/fC < 0.5 \qquad (14)$$

$$0.1 < rM1/fC < 0.45 \qquad (14\text{-}1)$$

$$0.2 < rM1/fC < 0.4 \qquad (14\text{-}2)$$

Assuming that a lateral magnification of the second optical system U2 at the telephoto end during focusing on an object at infinity is βrT and a variable magnification ratio of the variable magnification optical system is MAG, it is preferable to satisfy Conditional Expression (15). By not allowing the result of Conditional Expression (15) to be equal to or less than the lower limit, fluctuation in spherical aberration during changing magnification can be suppressed. By not allowing the result of Conditional Expression (15) to be equal to or greater than the upper limit, it is possible to achieve a high variable magnification ratio even in a case where the amount of movement of the lens group moving during changing magnification is reduced. In addition, in a case of a configuration in which Conditional Expression (15-1) is satisfied, it is possible to obtain more favorable characteristics.

$$-0.45 < \beta rT/MAG < -0.25 \qquad (15)$$

$$-0.4 < \beta rT/MAG < -0.28 \qquad (15\text{-}1)$$

Assuming that a focal length of the field lens group Gfd is fFd and a distance on the optical axis from the intermediate image, which is formed during focusing on the object at infinity, to the lens surface at the position closest to the object side in the second lens group G2 at the wide-angle end is LA, it is preferable to satisfy Conditional Expression (16). By satisfying Conditional Expression (16), it is possible to make the off-axis light intersect the optical axis Z at an appropriate position. As a result, there is an advantage in reducing the diameter of the lens group moving during changing magnification. In addition, in a case of a configuration in which Conditional Expression (16-1) is satisfied, it is possible to obtain more favorable characteristics. In a case of a configuration in which Conditional Expression (16-2) is satisfied, it is possible to obtain further more favorable characteristics.

$$0.4 < fFd/LA < 1 \qquad (16)$$

$$0.5 < fFd/LA < 0.8 \qquad (16\text{-}1)$$

$$0.55 < fFd/LA < 0.75 \qquad (16\text{-}2)$$

Assuming that a focal length of the first lens group G1 is fG1 and a focal length of the second lens group G2 is fG2, it is preferable to satisfy Conditional Expression (17). By satisfying Conditional Expression (17), it is possible to appropriately distribute the refractive power to the first lens group G1 and the second lens group G2. Thereby, it is possible to suppress fluctuation in spherical aberration during changing magnification, and it is also possible to reduce the effective diameters of the first lens group G1 and the second lens group G2. In addition, in a case of a configuration in which Conditional Expression (17-1) is satisfied, it is possible to obtain more favorable characteristics.

$$1.5 < fG1/fG2 < 4 \qquad (17)$$

$$1.7 < fG1/fG2 < 3.8 \qquad (17\text{-}1)$$

Although not shown in FIG. 1, various types of parallel plate shaped filters and/or cover glasses may be disposed between the lens closest to the image side and the image plane Sim and/or between an optical element and an optical element. It is possible to modify change in aberration, which is caused by arranging the various filters and/or the cover glass, to such a degree that does not cause a practical problem, by changing a small number of design parameters.

The above-mentioned preferred configurations and available configurations may be optional combinations, and it is preferable to selectively adopt the configurations in accordance with required specification. According to the present embodiment, it is possible to realize a variable magnification optical system, which has small fluctuations in various aberrations during changing magnification and has favorable optical performance while achieving a high variable magnification ratio. It should be noted that the "high variable magnification ratio" described herein means that the variable magnification ratio is equal to or greater than 4 times.

Next, numerical examples of the variable magnification optical system of the present invention will be described.

Example 1

A cross-sectional view and an optical path of a variable magnification optical system of Example 1 are shown in FIG. 1, and a configuration and an illustration method thereof is as described above. Therefore, repeated descriptions are partially omitted herein. The variable magnification optical system of Example 1 consists of, in order from the object side to the image side, a first optical system U1 and a second optical system U2. The first optical system U1 remains stationary with respect to an image plane Sim during changing magnification. The second optical system U2 includes a plurality of lens groups that move during changing magnification. The first optical system U1 consists of a ring-shaped first mirror M1, a second mirror M2, a correction lens group Gc, and a field lens group Gfd. The correction lens group Gc consists of one lens Lc1. The field lens group Gfd consists of two lenses Lf1 and Lf2 in order from the object side. The optical elements of the first optical system U1 all have a common optical axis Z. An intermediate image is formed in the vicinity of the object side of the field lens group Gfd in a state where the object at infinity is in focus. The first mirror M1 is an optical element having a power at the position closest to the object side in the optical path and also functions as a stop surface. Light from the object passes through the first mirror M1, the correction lens group Gc, the second mirror M2, the correction lens group Gc, and the field lens group Gfd in this order, and is then incident into the second optical system U2. The second optical system U2 consists of, in order from the object side, a first lens group G1 having a positive refractive power, a second lens group G2 having a positive refractive power, a third lens group G3 having a negative refractive power, and a fourth lens group G4 having a positive refractive power. During changing magnification, the first lens group G1, the second lens group G2, and the third lens group G3 move in the direction of the optical axis with loci different from one another, and the fourth lens group G4 remains stationary with respect to the image plane Sim. The first lens group G1 consists of three lenses L11 to L13. The second lens group G2 consists of one lens L21. The third lens group G3 consists of four lenses L31 to L34. The fourth lens group G4 consists of one lens L41. The third lens group G3 has a cemented lens in which a positive lens and a negative lens are cemented. The outline of the variable magnification optical system of Example 1 has been described above.

Table 1 shows basic lens data of the variable magnification optical system of Example 1, Table 2 shows specification and variable surface distances, and Table 3 shows aspheric surface coefficients thereof. Tables 1 and 2 show data in a state where the object at infinity is in focus. Table 1 shows constituent elements along the optical path. In Table 1, the column of the surface number shows surface numbers. The surface closest to the object side on the optical path is the first surface, and the surface numbers increase one by one toward the image side along the optical path. The column of r shows radii of curvature of the respective surfaces. The column of d shows surface distances on the optical axis between the respective surfaces and the surfaces adjacent to the image side on the optical path. The column of material shows the material names of the respective constituent elements and the names of the manufacturers of the materials with under bars interposed therebetween. The manufacturer names are shown schematically. For example, "OHARA" is OHARA CORPORATION. The column of Nd in Table 1 shows the refractive indices of the respective constituent elements at the d line. The column of vd shows the Abbe numbers of the respective constituent elements at the d line. The column of θgF shows the partial dispersion ratios of the respective constituent elements between the g line and the F line. The column of θCt shows the partial dispersion ratios of the respective constituent elements between the C line and the t line.

In Table 1, the sign of the radius of curvature of the surface convex toward the object side is positive and the sign of the radius of curvature of the surface convex toward the image side is negative. In the column of the surface number in Table 1, in addition to each surface number, "(reflective surface)" is attached to the surface corresponding to the reflective surface "(intermediate image)" is attached to the surface corresponding to the intermediate image, and "(image plane)" is attached to the surface corresponding to the image plane Sim. In Table 1, the variable surface distance is written in the column of d, where the surface number of the object side surface corresponding to the distance is attached to "D".

In Table 2, the absolute value of the focal length of the whole system, the F number, the maximum image height, and the maximum half angle of view are shown in the rows labeled "|Focal length|", "FNo.", "Image height", and "Half angle of view", respectively. Table 2 shows the values of the variable surface distances. The values shown in Table 2 are values on the d line basis. In Table 2, the respective values of the wide-angle end state, the first intermediate focal length state, the second intermediate focal length state, and the telephoto end state are shown in the columns labeled W, M1, M2, and T, respectively.

In Table 1, the reference sign * is attached to surface numbers of aspheric surfaces, and numerical values of the paraxial radius of curvature are written into the column of the radius of curvature of the aspheric surface. Table 3 shows surface numbers of aspheric surfaces, and the rows of K and Am (m=4, 6, 8, 10) show numerical values of aspheric surface coefficients of the respective aspheric surfaces. The "E±n" (n: an integer) in numerical values of the aspheric surface coefficients of Table 3 indicates "×10$^{±n}$". K and Am are the aspheric surface coefficients in the aspheric expression represented by the following expression.

$$Zd = C \times h^2 / \{1 + (1-(1+K) \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, and K and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Surface number | r | d | Material | Nd | vd | θgF | θCt |
|---|---|---|---|---|---|---|---|
| 1 (Reflective surface) | −1033.81950 | −316.344 | | | | | |
| 2* | 135.65558 | −35.000 | LBSL7_OHARA | 1.516330 | 64.06 | 0.5333 | 0.8785 |
| 3* | 143.67806 | −0.200 | | | | | |
| 4 (Reflective surface) | −831.53073 | 0.200 | | | | | |
| 5* | 143.67806 | 35.000 | LBSL7_OHARA | 1.516330 | 64.06 | 0.5333 | 0.8785 |
| 6* | 135.65558 | 0.000 | | | | | |
| 7 (Intermediate image) | ∞ | 3.560 | | | | | |
| 8 | −51.26904 | 14.405 | SNBH56_OHARA | 1.854780 | 24.80 | 0.6122 | 0.6739 |
| 9 | 71.05768 | 15.000 | SLAH88_OHARA | 1.916500 | 31.60 | 0.5911 | 0.7059 |
| 10 | −48.49433 | D10 | | | | | |
| 11 | −22.56452 | 3.200 | SLAL59_OHARA | 1.733997 | 51.47 | 0.5486 | 0.8067 |
| 12 | 66.03152 | 1.749 | | | | | |
| 13 | 9397.11500 | 9.462 | SFPL53_OHARA | 1.438750 | 94.93 | 0.5340 | 0.8373 |
| 14 | −31.43051 | 0.200 | | | | | |
| 15 | 121.79684 | 13.350 | SFPL53_OHARA | 1.438750 | 94.93 | 0.5340 | 0.8373 |
| 16 | −30.30142 | D16 | | | | | |
| 17 | 35.62791 | 11.146 | SFPL53_OHARA | 1.438750 | 94.93 | 0.5340 | 0.8373 |
| 18 | −160.92832 | D18 | | | | | |
| 19 | 35.24937 | 3.300 | SFPL53_OHARA | 1.438750 | 94.93 | 0.5340 | 0.8373 |
| 20 | 50.73617 | 0.200 | | | | | |
| 21 | 23.48294 | 7.272 | SFPL53_OHARA | 1.438750 | 94.93 | 0.5340 | 0.8373 |

TABLE 1-continued

Example 1

| Surface number | r | d | Material | Nd | vd | θgF | θCt |
|---|---|---|---|---|---|---|---|
| 22 | −63.70289 | 2.178 | SBAL41_OHARA | 1.563839 | 60.67 | 0.5402 | 0.8370 |
| 23 | 16.23503 | 5.280 | | | | | |
| 24 | −37.39752 | 3.822 | SBSL7_OHARA | 1.516330 | 64.14 | 0.5353 | 0.8687 |
| 25 | −90.13226 | D25 | | | | | |
| 26 | 2456.86976 | 2.800 | SLAH55V_OHARA | 1.834807 | 42.73 | 0.5648 | 0.7563 |
| 27 | −171.39974 | 40.251 | | | | | |
| 28 (Image plane) | ∞ | | | | | | |

TABLE 2

Example 1

| | W | M1 | M2 | T |
|---|---|---|---|---|
| \|Focal length\| | 500.007 | 1036.655 | 1399.998 | 2501.077 |
| FNo. | 3.125 | 6.479 | 8.750 | 15.632 |
| Image height | 8.000 | 8.000 | 8.000 | 8.000 |
| Half angle of view | 0.917 | 0.463 | 0.327 | 0.183 |
| D10 | 135.264 | 70.000 | 49.821 | 32.910 |
| D16 | 3.142 | 44.324 | 43.953 | 11.343 |
| D18 | 2.075 | 2.300 | 2.431 | 2.641 |
| D25 | 10.601 | 34.458 | 54.877 | 104.188 |

TABLE 3

Example 1

| | Second surface Sixth surface |
|---|---|
| K | 2.4308490E+00 |
| A4 | −2.3068712E−07 |
| A6 | 1.3696765E−12 |
| A8 | −7.7228548E−15 |
| A10 | 0.0000000E+00 |
| | Third surface Fifth surface |
| K | −1.5862915E+00 |
| A4 | −2.7678049E−08 |
| A6 | 1.7465463E−11 |
| A8 | −5.7911503E−15 |
| A10 | 0.0000000E+00 |

FIG. 11 shows aberration diagrams in a state where an object at the infinity is brought into focus through the variable magnification optical system of Example 1. In FIG. 11, in order from the left side, spherical aberration, astigmatism, distortion, and lateral chromatic aberration are shown. In FIG. 11, aberrations at the wide-angle end state are shown in the upper part indicated by WIDE, and aberrations at the telephoto end state are shown in the lower part indicated by TELE. In the spherical aberration diagram, the aberrations at a wavelength of 1970.1 nm, the C line, the d line, the F line, and the g line are indicated by the long dashed line, the chain line, the solid line, the short dashed line, and the chain double-dashed line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, the aberration at the wavelength of 1970.1 nm and the g line is indicated by the long dashed line and the chain double-dashed line, respectively. In the spherical aberration diagram, FNo. indicates the F number. In the other aberration diagrams, IH indicates the image height. Since the first mirror M1 has a ring shape, the data in the vicinity of 0 on the vertical axis of the spherical aberration diagram of FIG. 11 is shown as reference data.

Symbols, meanings, description methods, and illustration methods of the respective data pieces according to Example 1 are the same as those in the following examples unless otherwise noted. Therefore, in the following description, repeated description will be omitted.

Example 2

Figure 2:
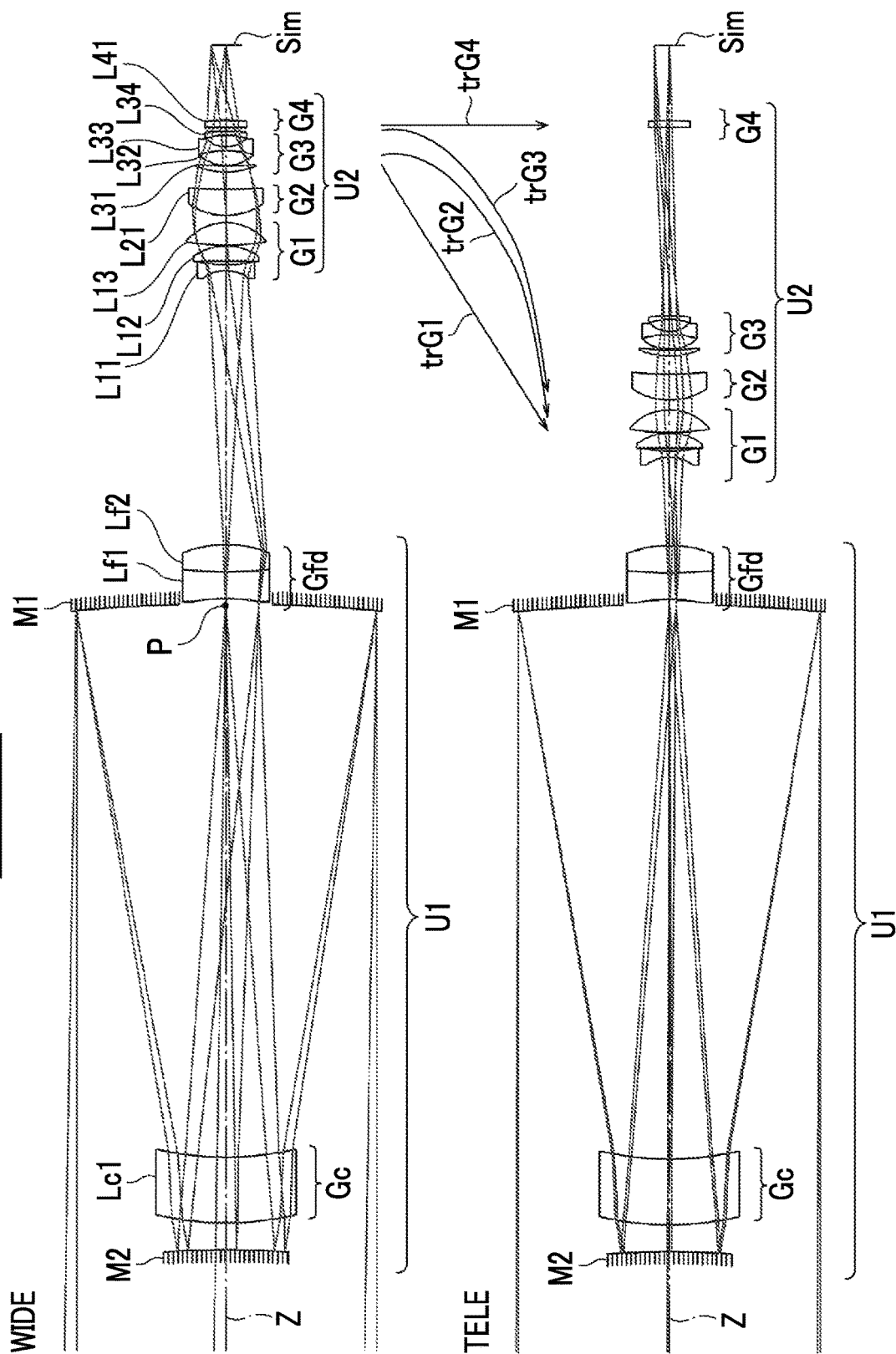
FIG. 2 is a cross-sectional view illustrating a configuration and an optical path of a variable magnification optical system at the wide-angle end and the telephoto end according to Example 2 of the present invention.

FIG. 2 shows a cross-sectional view and an optical path of the variable magnification optical system of Example 2. The variable magnification optical system of Example 2 has the same configuration as the outline of the variable magnification optical system of Example 1. Table 4 shows basic lens data of the variable magnification optical system of Example 2, Table 5 shows specification and variable surface distances, and FIG. 12 shows aberration diagrams thereof.

TABLE 4

Example 2

| Surface number | r | d | Material | Nd | vd | θgF | θCt |
|---|---|---|---|---|---|---|---|
| 1 (Reflective surface) | −940.33887 | −295.360 | | | | | |
| 2 | 163.45951 | −35.000 | SFSL5_OHARA | 1.487490 | 70.23 | 0.5300 | 0.8924 |
| 3 | 158.26945 | −11.507 | | | | | |
| 4 (Reflective surface) | −492.11463 | 11.507 | | | | | |
| 5 | 158.26945 | 35.000 | SFSL5_OHARA | 1.487490 | 70.23 | 0.5300 | 0.8924 |
| 6 | 163.45951 | 295.560 | | | | | |
| 7 (Intermediate image) | ∞ | 2.640 | | | | | |
| 8 | −98.83269 | 14.797 | SNBH56_OHARA | 1.854780 | 24.80 | 0.6122 | 0.6739 |
| 9 | 186.03574 | 14.407 | SLAH88_OHARA | 1.916500 | 31.60 | 0.5911 | 0.7059 |
| 10 | −63.52799 | D10 | | | | | |
| 11 | −20.22194 | 3.200 | SLAL59_OHARA | 1.733997 | 51.47 | 0.5486 | 0.8067 |

TABLE 4-continued

Example 2

| Surface number | r | d | Material | Nd | vd | θgF | θCt |
|---|---|---|---|---|---|---|---|
| 12 | 70.08051 | 1.808 | | | | | |
| 13 | −677.79831 | 8.251 | SFPL53_OHARA | 1.438750 | 94.93 | 0.5340 | 0.8373 |
| 14 | −28.43741 | 0.200 | | | | | |
| 15 | 129.06346 | 11.928 | SFPL53_OHARA | 1.438750 | 94.93 | 0.5340 | 0.8373 |
| 16 | −27.89917 | D16 | | | | | |
| 17 | 35.78594 | 13.782 | SFPL53_OHARA | 1.438750 | 94.93 | 0.5340 | 0.8373 |
| 18 | 235.02306 | D18 | | | | | |
| 19 | 40.31663 | 3.300 | SFPL53_OHARA | 1.438750 | 94.93 | 0.5340 | 0.8373 |
| 20 | 182.77982 | 0.200 | | | | | |
| 21 | 21.85254 | 7.807 | SFPL53_OHARA | 1.438750 | 94.93 | 0.5340 | 0.8373 |
| 22 | −54.44619 | 2.021 | SBAL41_OHARA | 1.563839 | 60.67 | 0.5402 | 0.8370 |
| 23 | 15.24145 | 6.357 | | | | | |
| 24 | −35.58368 | 2.000 | SBSL7_OHARA | 1.516330 | 64.14 | 0.5353 | 0.8687 |
| 25 | −112.05865 | D25 | | | | | |
| 26 | 922.59801 | 4.036 | SYGH51_OHARA | 1.754999 | 52.32 | 0.5475 | 0.8107 |
| 27 | −166.51349 | 40.150 | | | | | |
| 28 (Image plane) | ∞ | | | | | | |

TABLE 5

Example 2

| | W | M1 | M2 | T |
|---|---|---|---|---|
| \|Focal length\| | 500.039 | 1224.572 | 1399.989 | 2497.541 |
| FNo. | 3.125 | 7.654 | 8.750 | 15.610 |
| Image height | 8.000 | 8.000 | 8.000 | 8.000 |
| Half angle of view | 0.917 | 0.374 | 0.327 | 0.184 |
| D10 | 146.085 | 70.000 | 63.362 | 46.788 |
| D16 | 3.746 | 42.125 | 39.876 | 5.033 |
| D18 | 9.207 | 9.161 | 9.244 | 9.418 |
| D25 | 2.009 | 39.762 | 48.566 | 99.809 |

Example 3

Figure 3:
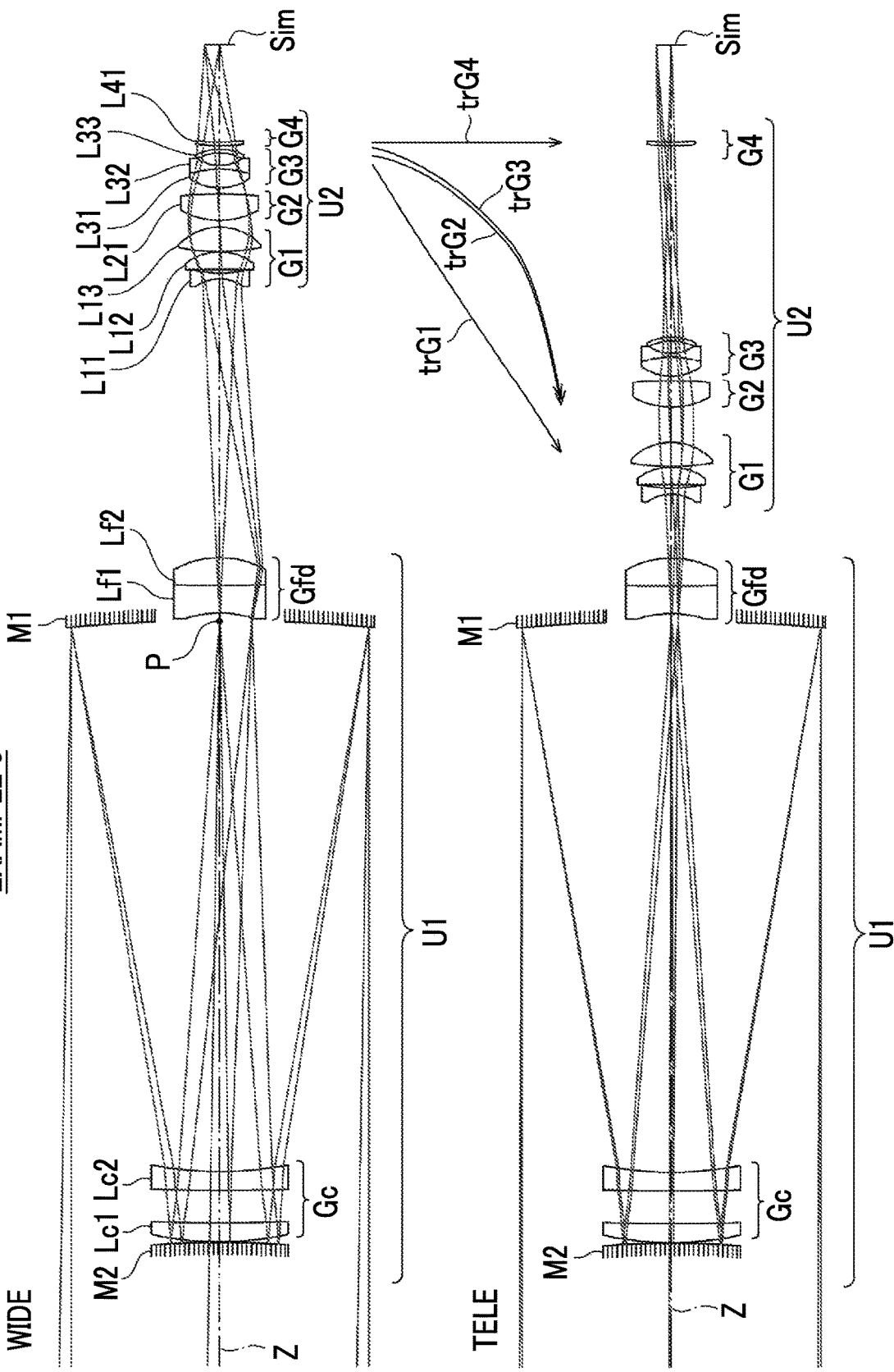
FIG. 3 is a cross-sectional view illustrating a configuration and an optical path of a variable magnification optical system at the wide-angle end and the telephoto end according to Example 3 of the present invention.

FIG. 3 shows a cross-sectional view and an optical path of the variable magnification optical system of Example 3. The variable magnification optical system of Example 3 is different from the variable magnification optical system of Example 1 in that the correction lens group Gc consists of two lenses Lc1 and Lc2 and the third lens group G3 consists of three lenses L31 to L33. The other configuration is the same as the outline of the variable magnification optical system of Example 1. Table 6 shows basic lens data of the variable magnification optical system of Example 3, Table 7 shows specification and variable surface distances, and FIG. 13 shows aberration diagrams thereof.

TABLE 6

Example 3

| Surface number | r | d | Material | Nd | vd | θgF | θCt |
|---|---|---|---|---|---|---|---|
| 1 (Reflective surface) | −922.75595 | −294.382 | | | | | |
| 2 | 189.54097 | −10.000 | SFSLS_OHARA | 1.487490 | 70.23 | 0.5300 | 0.8924 |
| 3 | 1188.04152 | −17.474 | | | | | |
| 4 | 775.56532 | −10.000 | SFSL5_OHARA | 1.487490 | 70.23 | 0.5300 | 0.8924 |
| 5 | 168.65411 | −0.200 | | | | | |
| 6 (Reflective surface) | −483.32143 | 0.200 | | | | | |
| 7 | 168.65411 | 10.000 | SFSL5_OHARA | 1.487490 | 70.23 | 0.5300 | 0.8924 |
| 8 | 775.56532 | 17.474 | | | | | |
| 9 | 1188.04152 | 10.000 | SFSL5_OHARA | 1.487490 | 70.23 | 0.5300 | 0.8924 |
| 10 | 189.54097 | 294.619 | | | | | |
| 11 (Intermediate image) | ∞ | 3.810 | | | | | |
| 12 | −57.05882 | 14.856 | SNBH56_OHARA | 1.854780 | 24.80 | 0.6122 | 0.6739 |
| 13 | 848.85181 | 14.868 | SLAH88_OHARA | 1.916500 | 31.60 | 0.5911 | 0.7059 |
| 14 | −50.50565 | D14 | | | | | |
| 15 | −21.92011 | 3.200 | SLAL59_OHARA | 1.733997 | 51.47 | 0.5486 | 0.8067 |
| 16 | 70.08315 | 1.8457 | | | | | |
| 17 | −1000.87953 | 9.379 | SFPL53_OHARA | 1.438750 | 94.93 | 0.5340 | 0.8373 |
| 18 | −29.90597 | 0.2000 | | | | | |
| 19 | 117.46531 | 12.938 | SFPL53_OHARA | 1.438750 | 94.93 | 0.5340 | 0.8373 |
| 20 | −30.24255 | D20 | | | | | |
| 21 | 41.54994 | 14.161 | SFPL53_OHARA | 1.438750 | 94.93 | 0.5340 | 0.8373 |
| 22 | −211.60538 | D22 | | | | | |
| 23 | 27.74930 | 9.988 | SFPL53_OHARA | 1.438750 | 94.93 | 0.5340 | 0.8373 |
| 24 | −55.08377 | 2.046 | SBAL41_OHARA | 1.563839 | 60.67 | 0.5402 | 0.8370 |
| 25 | 21.88803 | 6.468 | | | | | |
| 26 | −26.95242 | 2.000 | SBSL7_OHARA | 1.516330 | 64.14 | 0.5353 | 0.8687 |
| 27 | −30.14825 | D27 | | | | | |

TABLE 6-continued

Example 3

| Surface number | r | d | Material | Nd | vd | θgF | θCt |
|---|---|---|---|---|---|---|---|
| 28 | 93.06881 | 2.000 | SLAH55V_OHARA | 1.834807 | 42.73 | 0.5648 | 0.7563 |
| 29 | 176.36037 | 52.182 | | | | | |
| 30 (Image plane) | ∞ | | | | | | |

TABLE 7

Example 3

| | W | M1 | M2 | T |
|---|---|---|---|---|
| \|Focal length\| | 500.485 | 1117.112 | 1400.022 | 2475.451 |
| FNo. | 3.128 | 6.982 | 8.750 | 15.472 |
| Image height | 8.000 | 8.000 | 8.000 | 8.000 |
| Half angle of view | 0.916 | 0.410 | 0.327 | 0.185 |
| D14 | 149.026 | 70.000 | 55.561 | 34.238 |
| D20 | 3.545 | 49.642 | 49.123 | 18.792 |
| D22 | 3.230 | 2.259 | 2.420 | 2.765 |
| D27 | 2.000 | 35.900 | 50.696 | 102.006 |

Example 4

Figure 4:
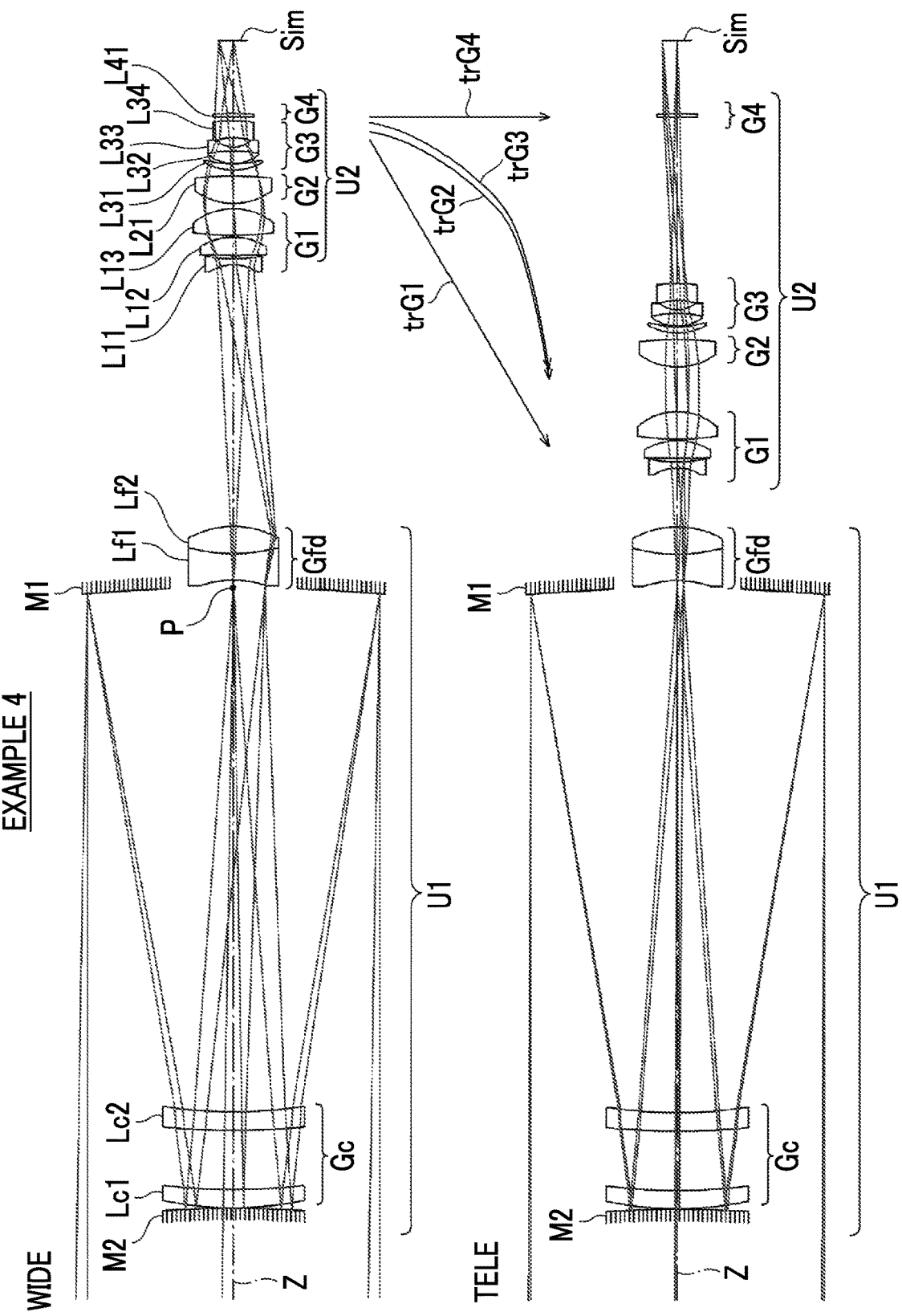
FIG. 4 is a cross-sectional view illustrating a configuration and an optical path of a variable magnification optical system at the wide-angle end and the telephoto end according to Example 4 of the present invention.

FIG. 4 shows a cross-sectional view and an optical path of the variable magnification optical system of Example 4. The variable magnification optical system of Example 4 is different from that of Example 1 in that the correction lens group Gc consists of two lenses Lc1 and Lc2. The other configuration is the same as the outline of the variable magnification optical system of Example 1. Table 8 shows basic lens data of the variable magnification optical system of Example 4, Table 9 shows specification and variable surface distances, and FIG. 14 shows aberration diagrams thereof.

TABLE 8

Example 4

| Surface number | r | d | Material | Nd | vd | θgF | θCt |
|---|---|---|---|---|---|---|---|
| 1 (Reflective surface) | −953.77868 | −286.986 | | | | | |
| 2 | 232.21307 | −10.000 | SBSL7_OHARA | 1.516330 | 64.14 | 0.5353 | 0.8687 |
| 3 | 390.17511 | −32.789 | | | | | |
| 4 | 300.32692 | −10.000 | SBSL7_OHARA | 1.516330 | 64.14 | 0.5353 | 0.8687 |
| 5 | 184.88521 | −0.200 | | | | | |
| 6 (Reflective surface) | −508.96238 | 0.200 | | | | | |
| 7 | 184.88521 | 10.000 | SBSL7_OHARA | 1.516330 | 64.14 | 0.5353 | 0.8687 |
| 8 | 300.32692 | 32.789 | | | | | |
| 9 | 390.17511 | 10.000 | SBSL7_OHARA | 1.516330 | 64.14 | 0.5353 | 0.8687 |
| 10 | 232.21307 | 287.186 | | | | | |
| 11 (Intermediate image) | ∞ | 3.939 | | | | | |
| 12 | −53.49439 | 14.432 | SNBH56_OHARA | 1.854780 | 24.80 | 0.6122 | 0.6739 |
| 13 | 92.68066 | 15.000 | SLAH88_OHARA | 1.916500 | 31.60 | 0.5911 | 0.7059 |
| 14 | −50.17468 | D14 | | | | | |
| 15 | −23.57864 | 3.200 | SLAL10_OHARA | 1.719995 | 50.23 | 0.5521 | 0.7931 |
| 16 | 70.45288 | 2.0203 | | | | | |
| 17 | 641.58789 | 9.923 | SFPL53_OHARA | 1.438750 | 94.93 | 0.5340 | 0.8373 |
| 18 | −33.26453 | 0.8596 | | | | | |
| 19 | 143.69669 | 15.000 | CAF2_SCHOTT | 1.433848 | 95.23 | 0.5386 | 0.8031 |
| 20 | −32.97214 | D20 | | | | | |
| 21 | 35.50896 | 15.000 | SFPL53_OHARA | 1.438750 | 94.93 | 0.5340 | 0.8373 |
| 22 | −178.58929 | D22 | | | | | |
| 23 | 33.09074 | 3.300 | SFPL53_OHARA | 1.438750 | 94.93 | 0.5340 | 0.8373 |
| 24 | 51.55537 | 0.200 | | | | | |
| 25 | 21.89785 | 7.017 | SFPL53_OHARA | 1.438750 | 94.93 | 0.5340 | 0.8373 |
| 26 | −61.72367 | 2.040 | SBAL41_OHARA | 1.563839 | 60.67 | 0.5402 | 0.8370 |
| 27 | 15.20944 | 5.086 | | | | | |
| 28 | −33.60080 | 9.237 | SNSL36_OHARA | 1.517417 | 52.43 | 0.5564 | 0.7992 |
| 29 | −87.39336 | D29 | | | | | |
| 30 | 1302.49303 | 2.000 | SLAH55V_OHARA | 1.834807 | 42.73 | 0.5648 | 0.7563 |
| 31 | −172.47891 | 40.000 | | | | | |
| 32 (Image plane) | ∞ | | | | | | |

TABLE 9

Example 4

|  | W | M1 | M2 | T |
|---|---|---|---|---|
| \|Focal length\| | 500.485 | 1117.112 | 1400.022 | 2475.451 |
| FNo. | 3.128 | 6.982 | 8.750 | 15.472 |
| Image height | 8.000 | 8.000 | 8.000 | 8.000 |
| Half angle of view | 0.916 | 0.410 | 0.327 | 0.185 |
| D14 | 143.316 | 70.000 | 51.042 | 32.247 |
| D20 | 3.000 | 51.755 | 53.198 | 24.447 |
| D22 | 3.255 | 3.455 | 3.536 | 3.686 |
| D29 | 2.000 | 26.362 | 43.795 | 91.192 |

Example 5

Figure 5:
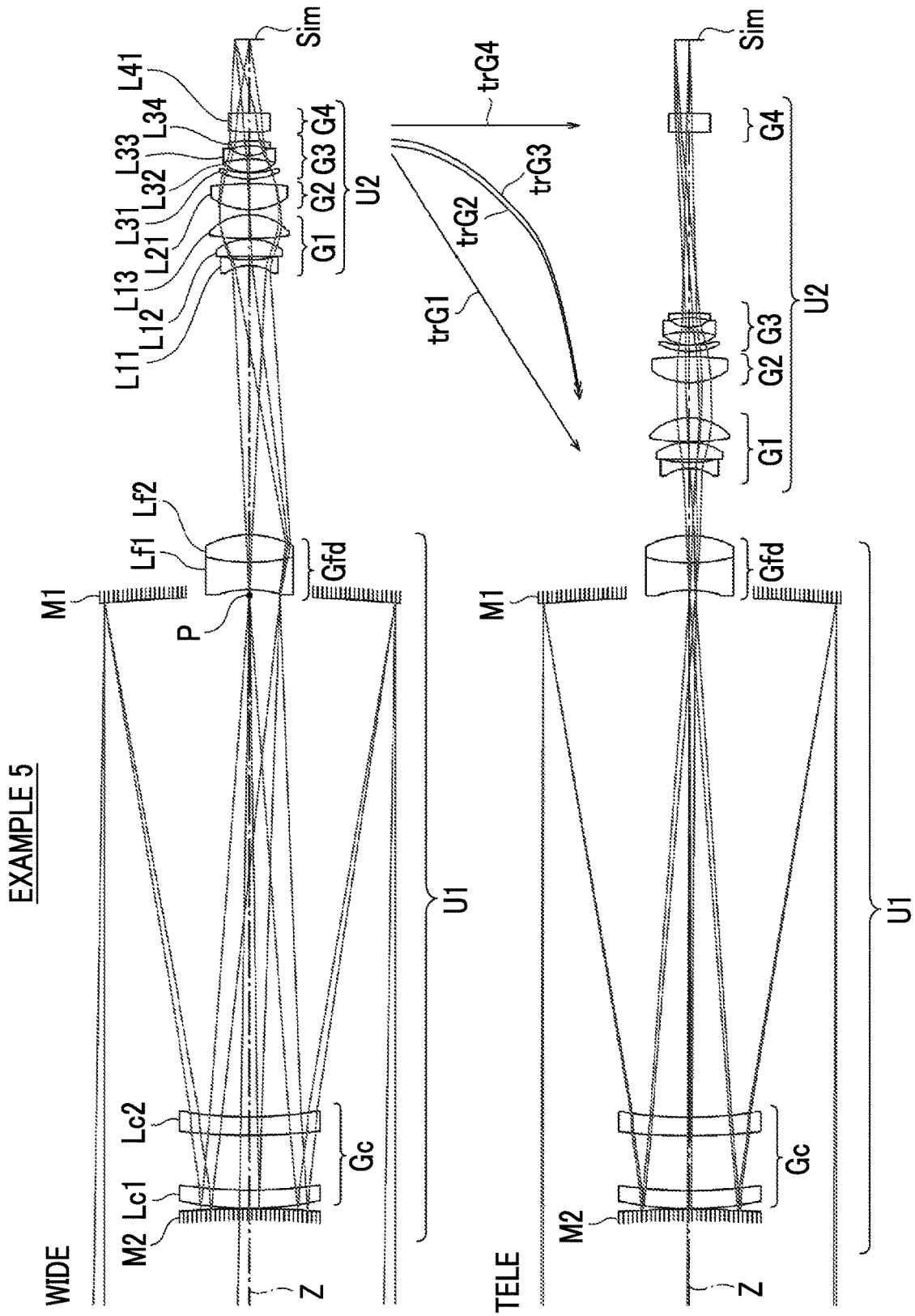
FIG. 5 is a cross-sectional view illustrating a configuration and an optical path of a variable magnification optical system at the wide-angle end and the telephoto end according to Example 5 of the present invention.

FIG. 5 shows a cross-sectional view and an optical path of the variable magnification optical system of Example 5. The variable magnification optical system of Example 5 is different from that of Example 1 in that the correction lens group Gc consists of two lenses Lc1 and Lc2. The other configuration is the same as the outline of the variable magnification optical system of Example 1. Table 10 shows basic lens data of the variable magnification optical system of Example 5, Table 11 shows specification and variable surface distances, and FIG. 15 shows aberration diagrams thereof.

TABLE 10

Example 5

| Surface number | r | d | Material | Nd | vd | θgF | θCt |
|---|---|---|---|---|---|---|---|
| 1 (Reflective surface) | −946.65257 | −284.821 |  |  |  |  |  |
| 2 | 219.86076 | −10.000 | SBSL7_OHARA | 1.516330 | 64.14 | 0.5353 | 0.8687 |
| 3 | 343.36358 | −30.232 |  |  |  |  |  |
| 4 | 267.59406 | −10.000 | SBSL7_OHARA | 1.516330 | 64.14 | 0.5353 | 0.8687 |
| 5 | 176.67587 | −0.200 |  |  |  |  |  |
| 6 (Reflective surface) | −522.63966 | 0.200 |  |  |  |  |  |
| 7 | 176.67587 | 10.000 | SBSL7_OHARA | 1.516330 | 64.14 | 0.5353 | 0.8687 |
| 8 | 267.59406 | 30.232 |  |  |  |  |  |
| 9 | 343.36358 | 10.000 | SBSL7_OHARA | 1.516330 | 64.14 | 0.5353 | 0.8687 |
| 10 | 219.86076 | 285.021 |  |  |  |  |  |
| 11 (Intermediate image) | ∞ | 3.640 |  |  |  |  |  |
| 12 | −56.16891 | 15.000 | SNBH56_OHARA | 1.854780 | 24.80 | 0.6122 | 0.6739 |
| 13 | 95.93933 | 15.000 | SLAH88_OHARA | 1.916500 | 31.60 | 0.5911 | 0.7059 |
| 14 | −51.30080 | D14 |  |  |  |  |  |
| 15 | −22.22604 | 3.200 | SLAL59_OHARA | 1.733997 | 51.47 | 0.5486 | 0.8067 |
| 16 | 66.72028 | 1.7968 |  |  |  |  |  |
| 17 | 7888.01964 | 9.402 | SFPL53_OHARA | 1.438750 | 94.93 | 0.5340 | 0.8373 |
| 18 | −31.19160 | 0.2000 |  |  |  |  |  |
| 19 | 122.59768 | 13.121 | SFPL53_OHARA | 1.438750 | 94.93 | 0.5340 | 0.8373 |
| 20 | −30.25946 | D20 |  |  |  |  |  |
| 21 | 36.27005 | 14.247 | SFPL53_OHARA | 1.438750 | 94.93 | 0.5340 | 0.8373 |
| 22 | −160.25600 | D22 |  |  |  |  |  |
| 23 | 37.19780 | 3.300 | SFPL51_OHARA | 1.496999 | 81.54 | 0.5375 | 0.8258 |
| 24 | 48.82912 | 0.200 |  |  |  |  |  |
| 25 | 22.62490 | 7.223 | SFPL53_OHARA | 1.438750 | 94.93 | 0.5340 | 0.8373 |
| 26 | −58.10744 | 2.005 | SBAL41_OHARA | 1.563839 | 60.67 | 0.5402 | 0.8370 |
| 27 | 16.16206 | 5.302 |  |  |  |  |  |
| 28 | −36.63689 | 2.771 | SBSL7_OHARA | 1.516330 | 64.14 | 0.5353 | 0.8687 |
| 29 | −88.57416 | D29 |  |  |  |  |  |
| 30 | 775.40717 | 10.251 | SLAH55V_OHARA | 1.834807 | 42.73 | 0.5648 | 0.7563 |
| 31 | −200.50089 | 40.000 |  |  |  |  |  |
| 32 (Image plane) | ∞ |  |  |  |  |  |  |

TABLE 11

Example 5

|  | W | M1 | M2 | T |
|---|---|---|---|---|
| \|Focal length\| | 500.011 | 1101.262 | 1400.002 | 2500.929 |
| FNo. | 3.125 | 6.883 | 8.750 | 15.631 |
| Image height | 8.000 | 8.000 | 8.000 | 8.000 |
| Half angle of view | 0.917 | 0.416 | 0.327 | 0.183 |
| D14 | 147.066 | 70.000 | 55.793 | 36.779 |
| D20 | 3.000 | 50.686 | 50.095 | 19.247 |
| D22 | 2.593 | 2.709 | 2.767 | 2.888 |
| D29 | 5.228 | 34.492 | 49.232 | 98.972 |

Example 6

Figure 6:
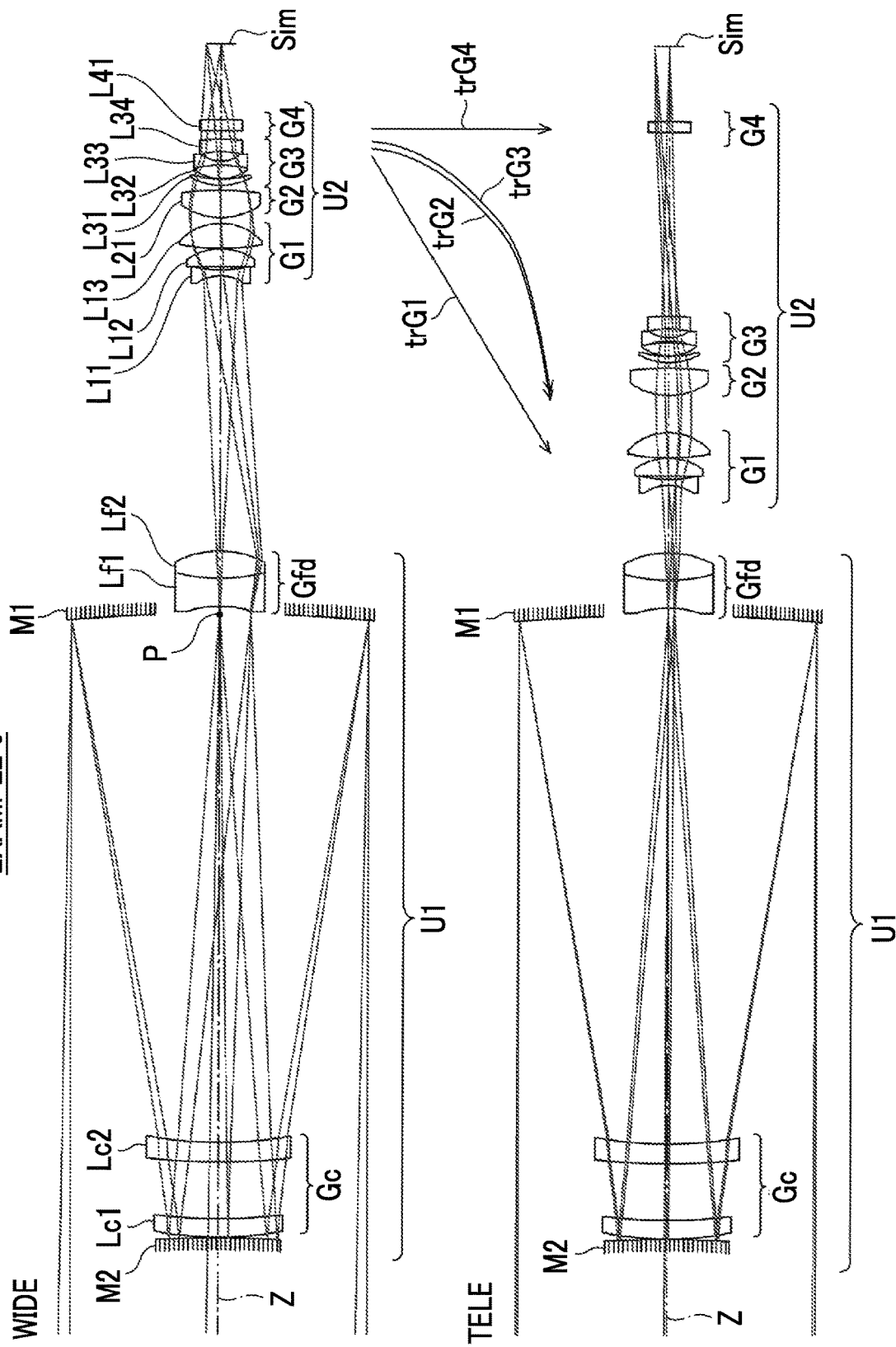
FIG. 6 is a cross-sectional view illustrating a configuration and an optical path of a variable magnification optical system at the wide-angle end and the telephoto end according to Example 6 of the present invention.

FIG. 6 shows a cross-sectional view and an optical path of the variable magnification optical system of Example 6. The variable magnification optical system of Example 6 is different from that of Example 1 in that the correction lens group Gc consists of two lenses Lc1 and Lc2. The other configuration is the same as the outline of the variable magnification optical system of Example 1. Table 12 shows basic lens data of the variable magnification optical system of Example 6, Table 13 shows specification and variable surface distances, and FIG. 16 shows aberration diagrams thereof.

TABLE 12

Example 6

| Surface number | r | d | Material | Nd | νd | θgF | θCt |
|---|---|---|---|---|---|---|---|
| 1 (Reflective surface) | −943.04827 | −283.613 | | | | | |
| 2 | 221.89858 | −10.457 | SFSL5_OHARA | 1.487490 | 70.23 | 0.5300 | 0.8924 |
| 3 | 373.33420 | −30.316 | | | | | |
| 4 | 293.61480 | −10.000 | SFSL5_OHARA | 1.487490 | 70.23 | 0.5300 | 0.8924 |
| 5 | 178.94372 | −0.200 | | | | | |
| 6 (Reflective surface) | −512.38205 | 0.200 | | | | | |
| 7 | 178.94372 | 10.000 | SFSL5_OHARA | 1.487490 | 70.23 | 0.5300 | 0.8924 |
| 8 | 293.61480 | 30.316 | | | | | |
| 9 | 373.33420 | 10.457 | SFSL5_OHARA | 1.487490 | 70.23 | 0.5300 | 0.8924 |
| 10 | 221.89858 | 283.813 | | | | | |
| 11 (Intermediate image) | ∞ | 3.656 | | | | | |
| 12 | −56.09328 | 15.000 | SNBH56_OHARA | 1.854780 | 24.80 | 0.6122 | 0.6739 |
| 13 | 89.59245 | 15.000 | SLAH88_OHARA | 1.916500 | 31.60 | 0.5911 | 0.7059 |
| 14 | −51.40885 | D14 | | | | | |
| 15 | −22.32153 | 3.200 | SLAL59_OHARA | 1.733997 | 51.47 | 0.5486 | 0.8067 |
| 16 | 67.23511 | 1.8292 | | | | | |
| 17 | −3378.12014 | 9.468 | SFPL53_OHARA | 1.438750 | 94.93 | 0.5340 | 0.8373 |
| 18 | −31.29870 | 0.2000 | | | | | |
| 19 | 128.13684 | 13.415 | SFPL53_OHARA | 1.438750 | 94.93 | 0.5340 | 0.8373 |
| 20 | −30.29020 | D20 | | | | | |
| 21 | 36.66872 | 14.576 | SFPL53_OHARA | 1.438750 | 94.93 | 0.5340 | 0.8373 |
| 22 | −169.96893 | D22 | | | | | |
| 23 | 33.82244 | 3.300 | SFPL53_OHARA | 1.438750 | 94.93 | 0.5340 | 0.8373 |
| 24 | 51.64878 | 0.200 | | | | | |
| 25 | 23.78425 | 7.296 | SFPL53_OHARA | 1.438750 | 94.93 | 0.5340 | 0.8373 |
| 26 | −58.52656 | 2.061 | SBAL41_OHARA | 1.563839 | 60.67 | 0.5402 | 0.8370 |
| 27 | 16.24485 | 5.146 | | | | | |
| 28 | −39.54787 | 6.627 | SBSL7_OHARA | 1.516330 | 64.14 | 0.5353 | 0.8687 |
| 29 | −115.44233 | D29 | | | | | |
| 30 | 1023.41055 | 5.918 | SLAH55V_OHARA | 1.834807 | 42.73 | 0.5648 | 0.7563 |
| 31 | −189.04456 | 40.616 | | | | | |
| 32 (Image plane) | ∞ | | | | | | |

TABLE 13

| | Example 6 | | | |
|---|---|---|---|---|
| | W | M1 | M2 | T |
| \|Focal length\| | 500.008 | 1090.519 | 1400.000 | 2500.939 |
| FNo. | 3.125 | 6.816 | 8.750 | 15.631 |
| Image height | 8.000 | 8.000 | 8.000 | 8.000 |
| Half angle of view | 0.917 | 0.420 | 0.327 | 0.183 |
| D14 | 147.171 | 70.000 | 55.075 | 36.160 |
| D20 | 3.000 | 51.337 | 50.925 | 19.982 |
| D22 | 2.722 | 2.889 | 2.953 | 3.080 |
| D29 | 4.813 | 33.480 | 48.752 | 98.484 |

Example 7

Figure 7:
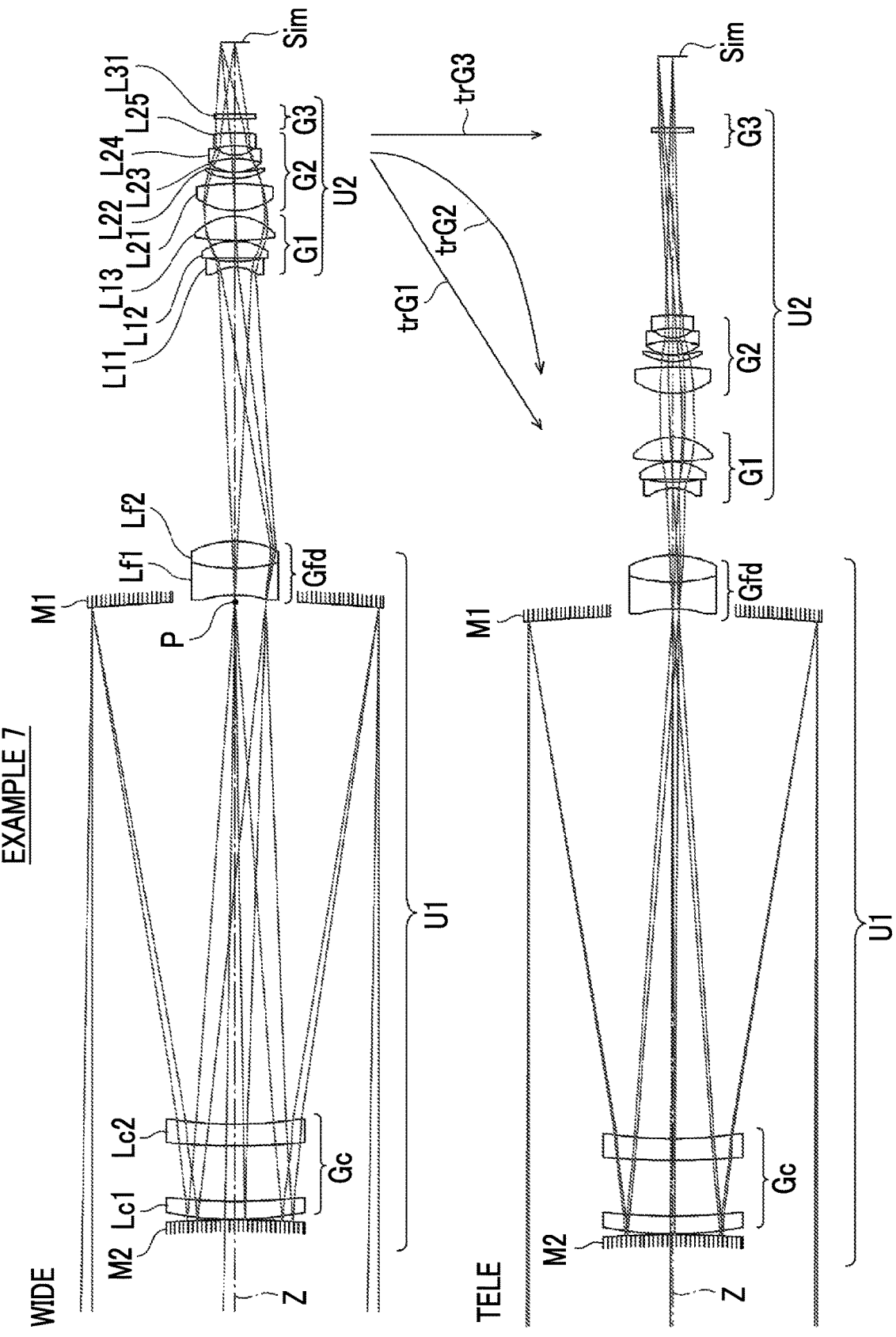
FIG. 7 is a cross-sectional view illustrating a configuration and an optical path of a variable magnification optical system at the wide-angle end and the telephoto end according to Example 7 of the present invention.

FIG. 7 shows a cross-sectional view and an optical path of the variable magnification optical system of Example 7. The variable magnification optical system of Example 7 is different from Example 1 in that the correction lens group Gc consists of two lenses Lc1 and Lc2 and the configuration of the second optical system U2 is different. The configuration of the first optical system U1 is the same as that of the outline of the variable magnification optical system of Example 1 except the correction lens group Gc. The second optical system U2 of Example 7 consists of, in order from the object side, a first lens group G1 having a positive refractive power, a second lens group G2 having a positive refractive power, and a third lens group G3 having a positive refractive power. During changing magnification, the first lens group G1 and the second lens group G2 move in the direction of the optical axis with loci different from each other, and the third lens group G3 remains stationary with respect to the image plane Sim. The first lens group G1 consists of three lenses L11 to L13. The second lens group G2 consists of five lenses L21 to L25. The third lens group G3 consists of one lens L31. The second lens group G2 has a cemented lens in which a positive lens and a negative lens are cemented. The outline of the variable magnification optical system of Example 7 has been described above.

Table 14 shows basic lens data of the variable magnification optical system of Example 7, Table 15 shows specification and variable surface distances, and FIG. 17 shows aberration diagrams thereof.

TABLE 14

| | | Example 7 | | | | | |
|---|---|---|---|---|---|---|---|
| Surface number | r | d | Material | Nd | vd | θgF | θCt |
| 1 (Reflective surface) | −963.16574 | −289.965 | | | | | |
| 2 | 240.24636 | −11.873 | SBSL7_OHARA | 1.516330 | 64.14 | 0.5353 | 0.8687 |
| 3 | 454.57715 | −30.787 | | | | | |
| 4 | 347.79332 | −10.000 | SBSL7_OHARA | 1.516330 | 64.14 | 0.5353 | 0.8687 |
| 5 | 193.22724 | −0.200 | | | | | |
| 6 (Reflective surface) | −522.14291 | 0.200 | | | | | |
| 7 | 193.22724 | 10.000 | SBSL7_OHARA | 1.516330 | 64.14 | 0.5353 | 0.8687 |
| 8 | 347.79332 | 30.787 | | | | | |
| 9 | 454.57715 | 11.873 | SBSL7_OHARA | 1.516330 | 64.14 | 0.5353 | 0.8687 |
| 10 | 240.24636 | 290.165 | | | | | |
| 11 (Intermediate image) | ∞ | 3.514 | | | | | |
| 12 | −61.84350 | 15.000 | SNBH56_OHARA | 1.854780 | 24.80 | 0.6122 | 0.6739 |
| 13 | 91.06144 | 15.000 | SLAH88_OHARA | 1.916500 | 31.60 | 0.5911 | 0.7059 |
| 14 | −54.18851 | D14 | | | | | |
| 15 | −21.85440 | 3.200 | SLAL59_OHARA | 1.733997 | 51.47 | 0.5486 | 0.8067 |
| 16 | 71.08112 | 1.8456 | | | | | |
| 17 | −931.27576 | 9.500 | SFPL53_OHARA | 1.438750 | 94.93 | 0.5340 | 0.8373 |
| 18 | −30.64420 | 0.2000 | | | | | |
| 19 | 137.92622 | 13.470 | SFPL53_OHARA | 1.438750 | 94.93 | 0.5340 | 0.8373 |
| 20 | −30.31283 | D20 | | | | | |
| 21 | 36.37200 | 14.792 | SFPL53_OHARA | 1.438750 | 94.93 | 0.5340 | 0.8373 |
| 22 | −165.07536 | 3.086 | | | | | |
| 23 | 34.21656 | 3.300 | SFPL53_OHARA | 1.438750 | 94.93 | 0.5340 | 0.8373 |
| 24 | 48.44728 | 0.200 | | | | | |
| 25 | 23.46475 | 7.328 | SFPL53_OHARA | 1.438750 | 94.93 | 0.5340 | 0.8373 |
| 26 | −55.90379 | 2.000 | SBAL41_OHARA | 1.563839 | 60.67 | 0.5402 | 0.8370 |
| 27 | 16.34518 | 5.392 | | | | | |
| 28 | −36.92965 | 7.147 | SBSL7_OHARA | 1.516330 | 64.14 | 0.5353 | 0.8687 |
| 29 | −87.59304 | D29 | | | | | |
| 30 | 179.02404 | 2.710 | SLAH55V_OHARA | 1.834807 | 42.73 | 0.5648 | 0.7563 |
| 31 | 22898.94031 | 40.002 | | | | | |
| 32 (Image plane) | ∞ | | | | | | |

TABLE 15

| | \|Example 7\| | | | |
|---|---|---|---|---|
| | W | M1 | M2 | T |
| \|Focal length\| | 500.009 | 1122.717 | 1400.005 | 2500.933 |
| FNo. | 3.125 | 7.017 | 8.750 | 15.631 |
| Image height | 8.000 | 8.000 | 8.000 | 8.000 |
| Half angle of view | 0.917 | 0.408 | 0.327 | 0.183 |
| D14 | 151.547 | 70.000 | 56.640 | 37.130 |
| D20 | 3.000 | 54.406 | 54.138 | 24.040 |
| D29 | 7.603 | 37.744 | 51.372 | 100.980 |

Example 8

Figure 8:
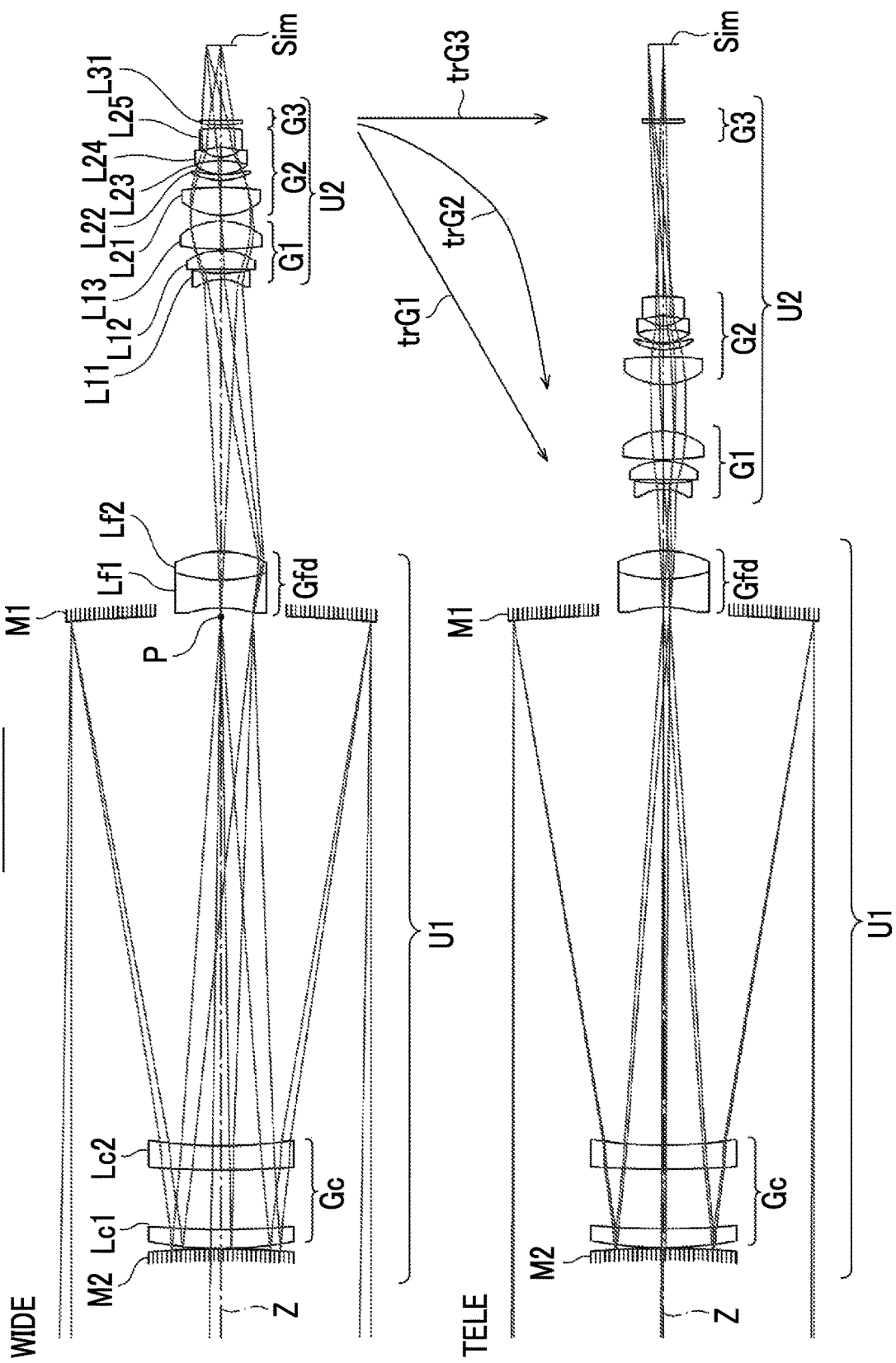
FIG. 8 is a cross-sectional view illustrating a configuration and an optical path of a variable magnification optical system at the wide-angle end and the telephoto end according to Example 8 of the present invention.

FIG. 8 shows a cross-sectional view and an optical path of the variable magnification optical system of Example 8. The variable magnification optical system of Example 8 has the same configuration as the outline of the variable magnification optical system of Example 7. Table 16 shows basic lens data of the variable magnification optical system of Example 8, Table 17 shows specification and variable surface distances, and FIG. 18 shows aberration diagrams thereof.

TABLE 16

| | | Example 8 | | | | | |
|---|---|---|---|---|---|---|---|
| Surface number | r | d | Material | Nd | vd | θgF | θCt |
| 1 (Reflective surface) | −938.69970 | −281.849 | | | | | |
| 2 | 249.10440 | −12.737 | SBSL7_OHARA | 1.516330 | 64.14 | 0.5353 | 0.8687 |
| 3 | 513.03789 | −32.370 | | | | | |
| 4 | 388.76526 | −10.000 | SBSL7_OHARA | 1.516330 | 64.14 | 0.5353 | 0.8687 |
| 5 | 197.90988 | −0.200 | | | | | |
| 6 (Reflective surface) | −488.98699 | 0.200 | | | | | |
| 7 | 197.90988 | 10.000 | SBSL7_OHARA | 1.516330 | 64.14 | 0.5353 | 0.8687 |
| 8 | 388.76526 | 32.370 | | | | | |
| 9 | 513.03789 | 12.737 | SBSL7_OHARA | 1.516330 | 64.14 | 0.5353 | 0.8687 |
| 10 | 249.10440 | 282.049 | | | | | |
| 11 (Intermediate image) | ∞ | 3.628 | | | | | |
| 12 | −58.89509 | 15.000 | SNBH56_OHARA | 1.854780 | 24.80 | 0.6122 | 0.6739 |
| 13 | 78.42668 | 15.000 | SLAH88_OHARA | 1.916500 | 31.60 | 0.5911 | 0.7059 |
| 14 | −52.77514 | D14 | | | | | |
| 15 | −22.69003 | 3.200 | SLAL10_OHARA | 1.719995 | 50.23 | 0.5521 | 0.7931 |
| 16 | 86.53277 | 2.1039 | | | | | |
| 17 | −2513.71582 | 10.059 | SFPL53_OHARA | 1.438750 | 94.93 | 0.5340 | 0.8373 |
| 18 | −31.86847 | 0.8661 | | | | | |
| 19 | 173.90341 | 15.000 | CAF2_SCHOTT | 1.433848 | 95.23 | 0.5386 | 0.8031 |
| 20 | −33.73926 | D20 | | | | | |
| 21 | 34.09354 | 14.840 | SFPL53_OHARA | 1.438750 | 94.93 | 0.5340 | 0.8373 |
| 22 | −176.01416 | 3.791 | | | | | |
| 23 | 33.21222 | 3.012 | SFPL53_OHARA | 1.438750 | 94.93 | 0.5340 | 0.8373 |
| 24 | 51.22226 | 0.200 | | | | | |
| 25 | 22.21014 | 7.081 | SFPL53_OHARA | 1.438750 | 94.93 | 0.5340 | 0.8373 |
| 26 | −51.07424 | 2.000 | SBAL41_OHARA | 1.563839 | 60.67 | 0.5402 | 0.8370 |
| 27 | 15.32906 | 5.242 | | | | | |
| 28 | −31.32340 | 10.263 | SNSL36_OHARA | 1.516330 | 64.14 | 0.5353 | 0.8687 |
| 29 | −72.51517 | D29 | | | | | |
| 30 | 142.64101 | 2.000 | SLAH55V_OHARA | 1.834807 | 42.73 | 0.5648 | 0.7563 |
| 31 | 745.52557 | 40.069 | | | | | |
| 32 (Image plane) | ∞ | | | | | | |

TABLE 17

Example 8

| | W | M1 | M2 | T |
|---|---|---|---|---|
| \|Focal length\| | 500.010 | 1026.176 | 1400.005 | 2500.864 |
| FNo. | 3.125 | 6.414 | 8.750 | 15.630 |
| Image height | 8.000 | 8.000 | 8.000 | 8.000 |
| Half angle of view | 0.917 | 0.447 | 0.327 | 0.183 |
| D14 | 144.290 | 70.000 | 50.698 | 32.468 |
| D20 | 3.000 | 52.603 | 54.169 | 24.721 |
| D29 | 2.000 | 26.687 | 44.423 | 92.100 |

Example 9

Figure 9:
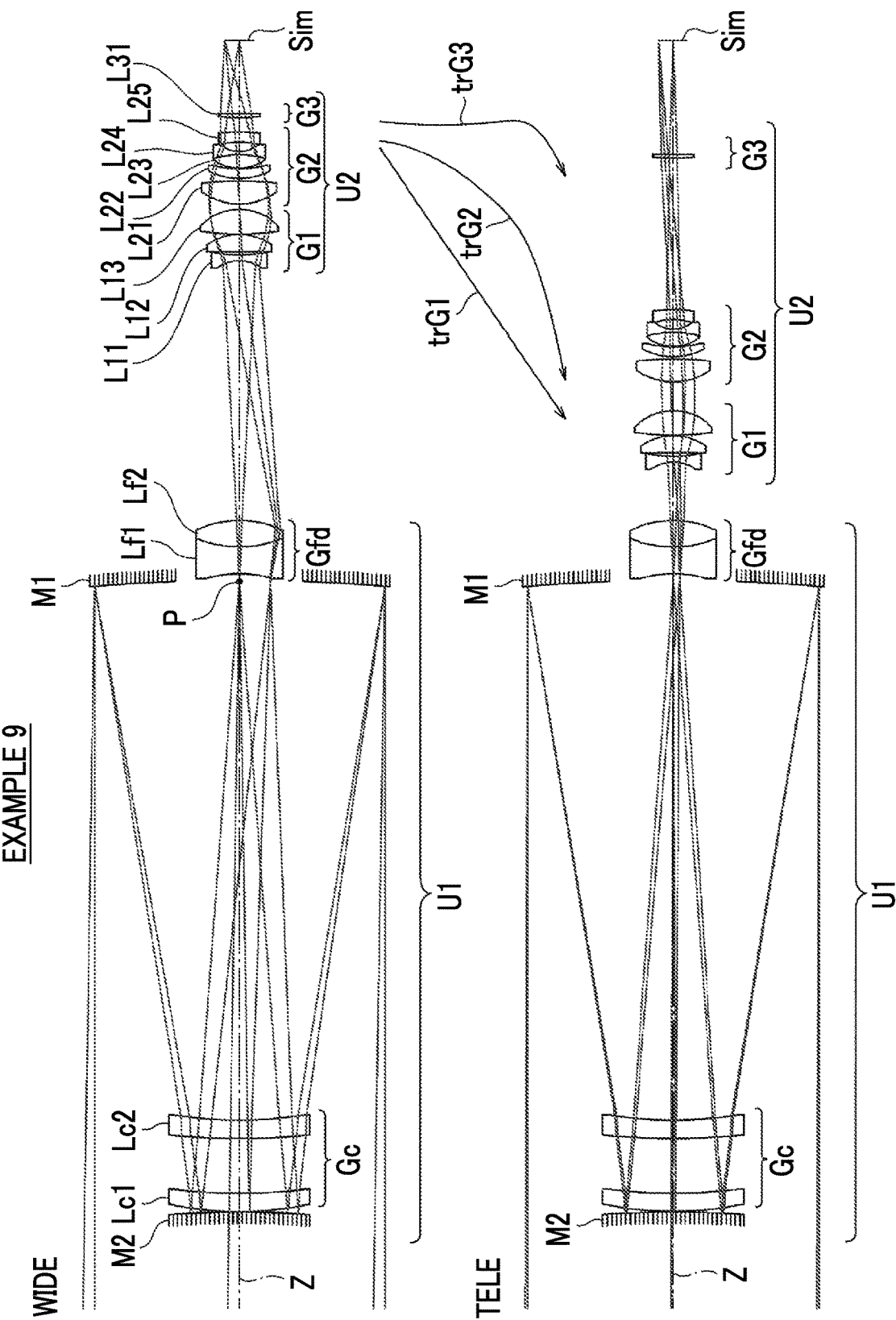
FIG. 9 is a cross-sectional view illustrating a configuration and an optical path of a variable magnification optical system at the wide-angle end and the telephoto end according to Example 9 of the present invention.
Figure 10:
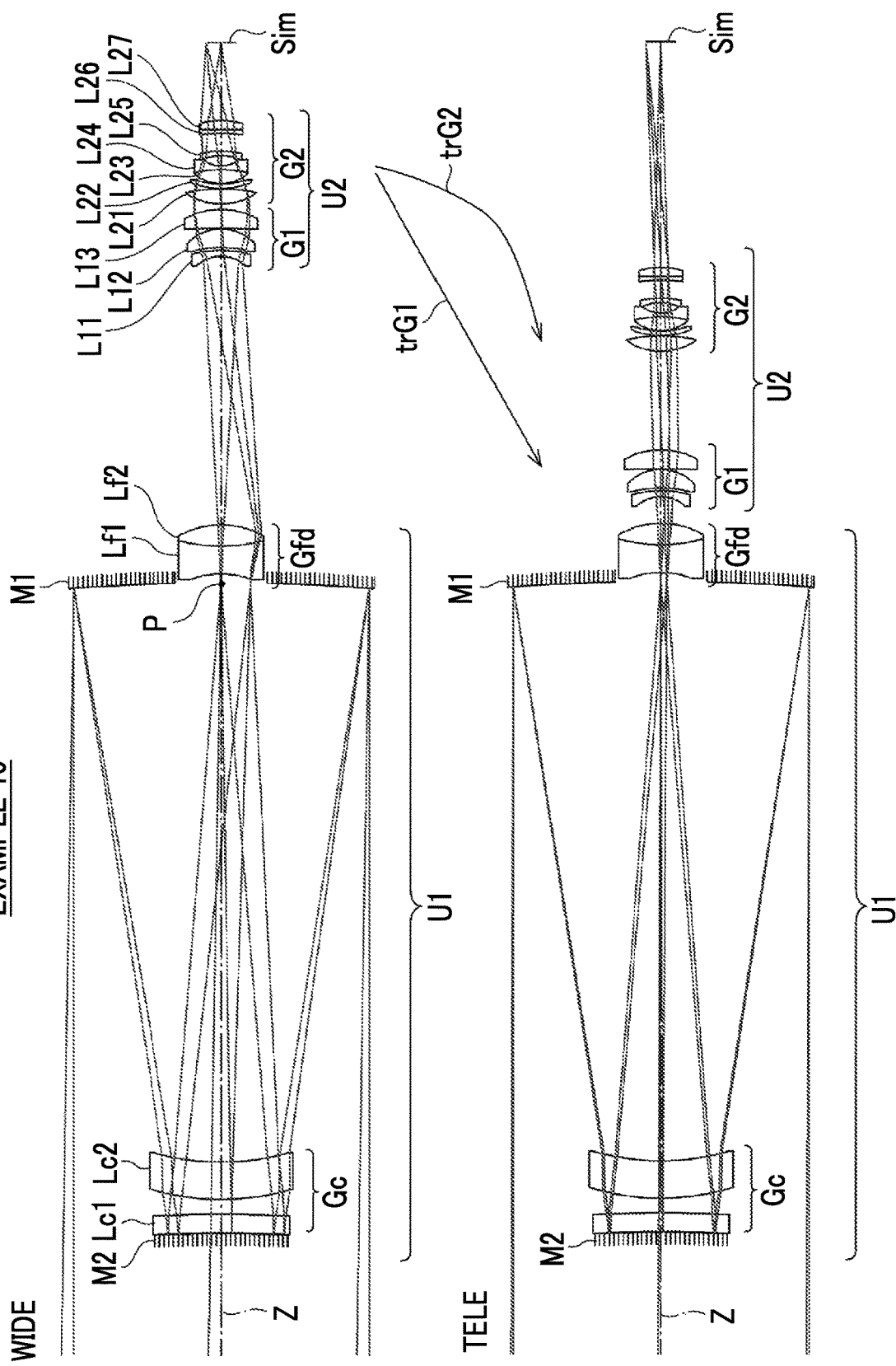
FIG. 10 is a cross-sectional view illustrating a configuration and an optical path of a variable magnification optical system at the wide-angle end and the telephoto end according to Example 10 of the present invention.

FIG. 9 shows a cross-sectional view and an optical path of the variable magnification optical system of Example 9. The variable magnification optical system of Example 9 is different from that of Example 7 in that the first lens group G1, the second lens group G2, and the third lens group G3 move in the direction of the optical axis with loci different from one another during changing magnification. The other configuration is the same as the outline of the variable magnification optical system of Example 7. Table 18 shows basic lens data of the variable magnification optical system of Example 9, Table 19 shows specification and variable surface distances, and FIG. 19 shows aberration diagrams thereof.

TABLE 18

Example 9

| Surface number | r | d | Material | Nd | vd | θgF | θCt |
|---|---|---|---|---|---|---|---|
| 1 (Reflective surface) | −977.09951 | −294.679 | | | | | |
| 2 | 229.88146 | −10.000 | SBSL7_OHARA | 1.516330 | 64.14 | 0.5353 | 0.8687 |
| 3 | 395.80136 | −29.887 | | | | | |
| 4 | 299.58796 | −10.000 | SBSL7_OHARA | 1.516330 | 64.14 | 0.5353 | 0.8687 |
| 5 | 184.83788 | −0.200 | | | | | |
| 6 (Reflective surface) | −551.79666 | 0.200 | | | | | |
| 7 | 184.83788 | 10.000 | SBSL7_OHARA | 1.516330 | 64.14 | 0.5353 | 0.8687 |
| 8 | 299.58796 | 29.887 | | | | | |
| 9 | 395.80136 | 10.000 | SBSL7_OHARA | 1.516330 | 64.14 | 0.5353 | 0.8687 |
| 10 | 229.88146 | 294.879 | | | | | |
| 11 (Intermediate image) | ∞ | 3.363 | | | | | |
| 12 | −65.16245 | 14.948 | SNBH56_OHARA | 1.854780 | 24.80 | 0.6122 | 0.6739 |
| 13 | 62.75642 | 14.754 | SLAH88_OHARA | 1.916500 | 31.60 | 0.5911 | 0.7059 |
| 14 | −55.41523 | D14 | | | | | |
| 15 | −21.03798 | 3.200 | SLAL59_OHARA | 1.733997 | 51.47 | 0.5486 | 0.8067 |
| 16 | 72.36001 | 1.7582 | | | | | |
| 17 | −1272.75293 | 9.425 | SFPL53_OHARA | 1.438750 | 94.93 | 0.5340 | 0.8373 |
| 18 | −30.35569 | 0.2000 | | | | | |
| 19 | 151.22337 | 13.425 | SFPL53_OHARA | 1.438750 | 94.93 | 0.5340 | 0.8373 |
| 20 | −29.69505 | D20 | | | | | |
| 21 | 35.82341 | 12.530 | SFPL53_OHARA | 1.438750 | 94.93 | 0.5340 | 0.8373 |
| 22 | −169.82249 | 1.277 | | | | | |
| 23 | 35.95511 | 5.250 | SFPL53_OHARA | 1.438750 | 94.93 | 0.5340 | 0.8373 |
| 24 | 54.29948 | 0.371 | | | | | |
| 25 | 23.37249 | 7.265 | SFPL53_OHARA | 1.438750 | 94.93 | 0.5340 | 0.8373 |
| 26 | −57.78747 | 2.000 | SBAL41_OHARA | 1.563839 | 60.67 | 0.5402 | 0.8370 |
| 27 | 15.91395 | 5.262 | | | | | |
| 28 | −35.23451 | 5.463 | SBSL7_OHARA | 1.516330 | 64.14 | 0.5353 | 0.8687 |
| 29 | −80.75072 | D29 | | | | | |
| 30 | 119.88367 | 2.052 | SLAL7_OHARA | 1.651597 | 58.55 | 0.8270 | 0.5425 |
| 31 | −7647.27929 | D31 | | | | | |
| 32 (Image plane) | ∞ | | | | | | |

TABLE 19

Example 9

|  | W | M1 | M2 | T |
|---|---|---|---|---|
| \|Focal length\| | 500.010 | 1026.176 | 1400.005 | 2500.864 |
| FNo. | 3.125 | 6.414 | 8.750 | 15.630 |
| Image height | 8.000 | 8.000 | 8.000 | 8.000 |
| Half angle of view | 0.917 | 0.442 | 0.327 | 0.183 |
| D14 | 141.509 | 70.000 | 52.163 | 31.923 |
| D20 | 3.000 | 47.322 | 47.123 | 15.726 |
| D29 | 7.77955 | 34.969 | 51.472 | 82.529 |
| D31 | 40.203 | 40.200 | 41.732 | 62.314 |

Example 10

FIG. 9 shows a cross-sectional view and an optical path of the variable magnification optical system of Example 10. The variable magnification optical system of Example 10 is different from that of Example 7 in the configuration of the second optical system U2. The configuration of the first optical system U1 is the same as the outline of the variable magnification optical system of Example 7. The second optical system U2 of Example 10 consists of, in order from the object side, a first lens group G1 having a positive refractive power and a second lens group G2 having a positive refractive power. The first lens group G1 and the second lens group G2 move in the direction of the optical axis with loci different from one another during changing magnification. The first lens group G1 consists of three lenses L11 to L13. The second lens group G2 consists of seven lenses L21 to L27. The second lens group G2 has two sets of cemented lenses in which a positive lens and a negative lens are cemented. Table 20 shows basic lens data of the variable magnification optical system of Example 10, Table 21 shows specification and variable surface distances, Table 22 shows aspheric surface coefficients, and FIG. 20 shows aberration diagrams.

TABLE 20

Example 10

| Surface number | r | d | Material | Nd | vd | θgF | θCt |
|---|---|---|---|---|---|---|---|
| 1 (Reflective surface) | −1009.60656 | −306.892 |  |  |  |  |  |
| 2 | 155.49173 | −20.000 | SFSL5_OHARA | 1.487490 | 70.23 | 0.5300 | 0.8924 |
| 3 | 152.20738 | −8.000 |  |  |  |  |  |
| 4 | 224.52261 | −16.331 | SFSL5_OHARA | 1.487490 | 70.23 | 0.5300 | 0.8924 |
| 5 | 226.68843 | −0.200 |  |  |  |  |  |
| 6 (Reflective surface) | −646.86833 | 0.200 |  |  |  |  |  |
| 7 | 226.68843 | 16.331 | SFSL5_OHARA | 1.487490 | 70.23 | 0.5300 | 0.8924 |
| 8 | 224.52261 | 8.000 |  |  |  |  |  |
| 9 | 152.20738 | 20.000 | SFSL5_OHARA | 1.487490 | 70.23 | 0.5300 | 0.8924 |
| 10 | 155.49173 | 307.091 |  |  |  |  |  |
| 11 (Intermediate image) | ∞ | 4.754 |  |  |  |  |  |
| 12 | −43.05480 | 14.676 | SNPH1W_OHARA | 1.808095 | 22.76 | 0.6596 | 0.6307 |
| 13 | 99.29659 | 10.864 | SLAH58_OHARA | 1.882997 | 40.76 | 0.7397 | 0.5667 |
| 14 | −44.27169 | D14 |  |  |  |  |  |
| 15 | −19.41182 | 3.200 | SLAL8_OHARA | 1.712995 | 53.87 | 0.5459 | 0.8194 |
| 16 | −66.73802 | 1.6399 |  |  |  |  |  |
| 17 | −62.57013 | 10.110 | SFPL55_OHARA | 1.438750 | 94.93 | 0.5340 | 0.8373 |
| 18* | −23.97544 | 0.2028 |  |  |  |  |  |
| 19 | −777.75180 | 9.888 | CAF2_SCHOTT | 1.433848 | 95.23 | 0.5386 | 0.8031 |
| 20 | −41.30828 | D20 |  |  |  |  |  |
| 21 | 34.95049 | 8.304 | SFPL55_OHARA | 1.438750 | 94.66 | 0.5340 | 0.8410 |
| 22 | −87.47002 | 0.201 |  |  |  |  |  |
| 23 | 43.40566 | 2.372 | SFPL55_OHARA | 1.438750 | 94.66 | 0.5340 | 0.8410 |
| 24 | 45.07363 | 0.200 |  |  |  |  |  |
| 25 | 22.46084 | 7.466 | SFPL55_OHARA | 1.438750 | 94.66 | 0.5340 | 0.8410 |
| 26 | −56.33990 | 2.037 | SBSL7_OHARA | 1.516330 | 64.14 | 0.5353 | 0.8687 |
| 27 | 16.19715 | 5.218 |  |  |  |  |  |
| 28 | −24.80997 | 2.029 | SLAM54_OHARA | 1.756998 | 47.82 | 0.5565 | 0.7915 |
| 29 | −44.63804 | 7.619 |  |  |  |  |  |
| 30 | −77.80794 | 2.000 | SNBH53V_OHARA | 1.738000 | 32.33 | 0.5900 | 0.7154 |
| 31 | 251.64674 | 4.665 | SBSM25_OHARA | 1.658441 | 50.88 | 0.5560 | 0.7765 |
| 32 | −36.09746 | D32 |  |  |  |  |  |
| 33 (Image plane) | ∞ |  |  |  |  |  |  |

TABLE 21

| | Example 10 | | | |
|---|---|---|---|---|
| | W | M1 | M2 | T |
| \|Focal length\| | 500.083 | 961.761 | 1399.980 | 2501.897 |
| FNo. | 3.126 | 6.011 | 8.750 | 15.637 |
| Image height | 8.000 | 8.000 | 8.000 | 8.000 |
| Half angle of view | 0.917 | 0.442 | 0.327 | 0.183 |
| D14 | 143.435 | 70.000 | 39.601 | 15.286 |
| D20 | 3.000 | 60.147 | 72.235 | 55.006 |
| D32 | 42.67555 | 58.963 | 77.274 | 118.818 |

TABLE 22

| Example 10 Eighteenth surface | |
|---|---|
| K | −2.1807711E+00 |
| A4 | −1.8103223E−05 |
| A6 | 2.7299174E−09 |
| A8 | −1.0242453E−11 |
| A10 | −1.4740880E−14 |

Table 23 shows values corresponding to Conditional Expressions (1) to (17) of the variable magnification optical systems of Examples 1 to 10. Corresponding values other than the partial dispersion ratios in Table 23 are values on the d line basis.

TABLE 23

| Expression number | | Example 1 | Example 2 | Example 3 | Example 4 | Example 5 |
|---|---|---|---|---|---|---|
| (1) | θgFp − θgFn | −0.0022 | −0.0051 | 0.0073 | −0.0097 | −0.0017 |
| (2) | νdp − νdn | 27.47 | 29.07 | 16.92 | 31.84 | 25.24 |
| (3) | θCtp − θCtn | −0.0137 | −0.0046 | −0.0356 | 0.0083 | −0.0156 |
| (4) | θCtn | 0.8375 | 0.8375 | 0.8375 | 0.8098 | 0.8375 |
| (5) | θCtp | 0.8238 | 0.8329 | 0.8019 | 0.8181 | 0.8219 |
| (6) | νdn | 58.76 | 58.76 | 58.76 | 54.44 | 58.76 |
| (7) | Ndn | 1.60472 | 1.60472 | 1.60472 | 1.60042 | 1.60472 |
| (8) | θgFn | 0.5414 | 0.5414 | 0.5414 | 0.5496 | 0.5414 |
| (9) | θgFp | 0.5391 | 0.5363 | 0.5487 | 0.5399 | 0.5397 |
| (10) | νdp | 86.23 | 87.83 | 75.68 | 86.28 | 84.00 |
| (11) | Ndp | 1.50476 | 1.49146 | 1.58438 | 1.50394 | 1.51447 |
| (12) | fU2/fG1 | 0.355 | 0.369 | 0.375 | 0.325 | 0.355 |
| (13) | rM1/rM2 | 1.243 | 1.911 | 1.909 | 1.874 | 1.811 |
| (14) | rM1/fC | 0.107 | 0.293 | 0.264 | 0.275 | 0.252 |
| (15) | βrT/MAG | −0.344 | −0.346 | −0.317 | −0.319 | −0.326 |
| (16) | fFd/LA | 0.629 | 0.603 | 0.622 | 0.634 | 0.623 |
| (17) | fG1/fG2 | 3.539 | 2.643 | 2.617 | 3.760 | 3.561 |

| Expression number | | Example 6 | Example 7 | Example 8 | Example 9 | Example 10 |
|---|---|---|---|---|---|---|
| (1) | θgFp − θgFn | −0.0022 | −0.0022 | −0.0026 | 0.0415 | −0.0185 |
| (2) | νdp − νdn | 20.60 | 20.60 | 27.93 | 30.11 | 32.23 |
| (3) | θCtp − θCtn | −0.0137 | −0.0137 | −0.0148 | −0.0493 | 0.0315 |
| (4) | θCtn | 0.8375 | 0.8375 | 0.8329 | 0.8375 | 0.7919 |
| (5) | θCtp | 0.8238 | 0.8238 | 0.8181 | 0.7882 | 0.8233 |
| (6) | νdn | 58.76 | 58.76 | 58.35 | 58.76 | 55.28 |
| (7) | Ndn | 1.60472 | 1.60472 | 1.60005 | 1.60472 | 1.68108 |
| (8) | θgFn | 0.5414 | 0.5414 | 0.5425 | 0.5414 | 0.5569 |
| (9) | θgFp | 0.5391 | 0.5391 | 0.5399 | 0.5828 | 0.5384 |
| (10) | νdp | 79.36 | 79.36 | 86.28 | 88.87 | 87.50 |
| (11) | Ndp | 1.45168 | 1.45168 | 1.50394 | 1.47422 | 1.68108 |
| (12) | fU2/fG1 | 0.346 | 0.316 | 0.277 | 0.238 | 0.319 |
| (13) | rM1/rM2 | 1.841 | 1.845 | 1.920 | 1.771 | 1.561 |
| (14) | rM1/fC | 0.269 | 0.284 | 0.377 | 0.238 | 0.232 |
| (15) | βrT/MAG | −0.325 | −0.325 | −0.322 | −0.329 | −0.336 |
| (16) | fFd/LA | 0.623 | 0.619 | 0.618 | 0.625 | 0.694 |
| (17) | fG1/fG2 | 3.602 | 1.953 | 2.289 | 2.328 | 1.855 |

As can be seen from the above data, in the variable magnification optical systems of Examples 1 to 10, fluctuation in various aberrations during changing magnification is small, the variable magnification ratio is equal to or greater than 4.9 times, a high variable magnification ratio is achieved, and the load of the object side portion can be reduced. In addition, the variable magnification optical system can be configured with low costs, various aberrations are satisfactorily corrected in a wide range from the visible light region to the infrared light region, and high optical performance is achieved.

Figure 21:
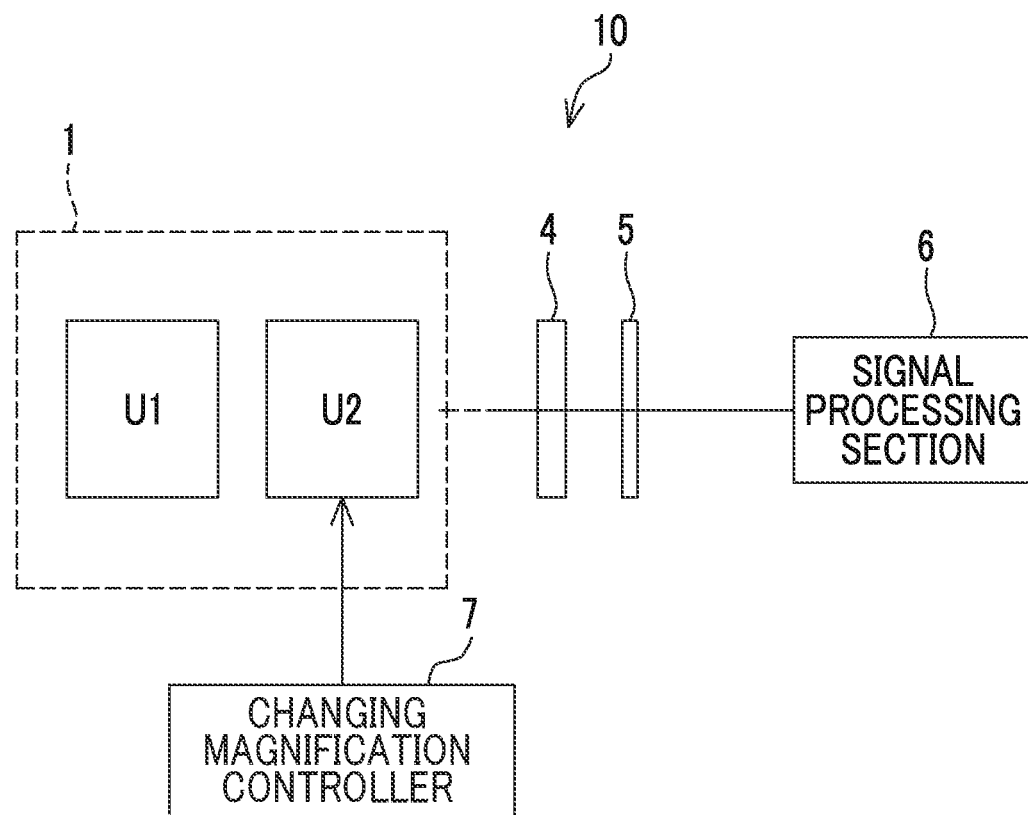
FIG. 21 is a schematic configuration diagram of an imaging apparatus according to an embodiment of the present invention.

Next, an imaging apparatus according to an embodiment of the present invention will be described. FIG. 21 is a schematic configuration diagram of an imaging apparatus 10 using the variable magnification optical system 1 according to the above-mentioned embodiment of the present invention as an example of an imaging apparatus of an embodiment of the present invention. As the imaging apparatus 10, for example, there is a surveillance camera, a video camera, an electronic still camera, or the like.

The imaging apparatus 10 comprises: the variable magnification optical system 1; a filter 4 that is disposed on the image side of the variable magnification optical system 1; an imaging element 5 that captures an image of a subject formed by the variable magnification optical system 1; a signal processing section 6 that arithmetically processes an output signal which is output from the imaging element 5; and a changing magnification controller 7 that changes the variable magnification ratio of the variable magnification optical system 1. FIG. 21 schematically shows the first optical system U1 and the second optical system U2 included in the variable magnification optical system 1. The imaging element 5 captures an image of a subject formed by the variable magnification optical system 1 and converts the image into an electric signal. The imaging element 5 is disposed such that the imaging surface thereof is coplanar with the image plane of the variable magnification optical system 1. As the imaging element 5, for example, it is possible to use a charge coupled device (CCD), a complementary metal oxide semiconductor (CMOS), or the like. It should be noted that FIG. 21 shows only one imaging element 5, but the imaging apparatus of the present invention is not limited to this, and may be a so-called three-plate imaging apparatus having three imaging elements.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric surface coefficient of each optical element are not limited to the values shown in the numerical examples, and different values may be used therefor.

What is claimed is:

1. A variable magnification optical system consisting of, in order from an object side:
  a first optical system that includes two reflecting mirrors having reflective surfaces arranged to face each other and remains stationary with respect to an image plane during changing magnification; and
  a second optical system that includes at least two positive lenses and at least one negative lens,
  wherein the two reflecting mirrors consist of
    a first reflecting mirror that has a reflective surface concave to the object side and reflects light, which is originated from an object, toward the object side, and
    a second reflecting mirror that has a reflective surface convex toward an image side and reflects the reflected light, which is reflected from the first reflecting mirror, toward the image side,
  wherein the second optical system includes, successively in order from a position closest to the object side,
    a first lens group that consistently moves to the object side during changing magnification from a wide-angle end to a telephoto end and has a positive refractive power, and
    a second lens group that moves in a direction of an optical axis with a locus different from a locus of the first lens group during changing magnification and has a positive refractive power,
  wherein an intermediate image is formed between the second reflecting mirror and the first lens group, and the intermediate image is re-formed through the second optical system, and
  wherein assuming that
    an average value of partial dispersion ratios of all the positive lenses in the second optical system between a g line and an F line is θgFp, and
    an average value of partial dispersion ratios of all the negative lenses in the second optical system between the g line and the F line is θgFn,
    Conditional Expression (1) is satisfied, $$-0.04 < \theta gFp - \theta gFn < 0.1 \quad (1).$$

2. The variable magnification optical system according to claim 1, wherein assuming that
  an average value of Abbe numbers of all the positive lenses in the second optical system at a d line is νdp, and
  an average value of Abbe numbers of all the negative lenses in the second optical system at the d line is νdn,
  Conditional Expression (2) is satisfied, $$10 < \nu dp - \nu dn < 40 \quad (2).$$

3. The variable magnification optical system according to claim 1, wherein assuming that
  an average value of partial dispersion ratios of all the positive lenses in the second optical system between a C line and a t line is θCtp, and
  an average value of the partial dispersion ratios of all the negative lenses in the second optical system between the C line and the t line is θCtn,
  Conditional Expression (3) is satisfied, $$-0.1 < \theta Ctp - \theta Ctn < 0.1 \quad (3).$$

4. The variable magnification optical system according to claim 1, wherein the first optical system includes a field lens group that consists of two or less lenses and that has a positive refractive power and that is a lens component closest to the intermediate image.

5. The variable magnification optical system according to claim 1, wherein the first reflecting mirror is an optical element having a power at a position closest to the object side on an optical path.

6. The variable magnification optical system according to claim 1, wherein the first optical system includes a correction lens group consisting of two or less lenses which are disposed in an optical path from the first reflecting mirror to the second reflecting mirror and in an optical path from the second reflecting mirror to a position of the intermediate image and which have a common optical axis with respect to the first reflecting mirror and the second reflecting mirror.

7. The variable magnification optical system according to claim 1, wherein assuming that an average value of the partial dispersion ratios of all the negative lenses in the second optical system between a C line and a t line is θCtn, Conditional Expression (4) is satisfied, $$0.75 < \theta Ctn < 0.9 \quad (4).$$

8. The variable magnification optical system according to claim 1, wherein assuming that an average value of the partial dispersion ratios of all the positive lenses in the second optical system between the C line and the t line is θCtp, Conditional Expression (5) is satisfied, $$0.75 < \theta Ctp < 0.9 \quad (5).$$

9. The variable magnification optical system according to claim 1, wherein assuming that an average value of Abbe numbers of all the negative lenses in the second optical system at a d line is νdn, Conditional Expression (6) is satisfied, $$50 < \nu dn < 65 \quad (6).$$

10. The variable magnification optical system according to claim 1, wherein assuming that an average value of refractive indices of all the negative lenses in the second optical system at a d line is Ndn, Conditional Expression (7) is satisfied, $$1.5 < Ndn < 1.75 \quad (7).$$

11. The variable magnification optical system according to claim 1, wherein Conditional Expression (8) is satisfied, $$0.53 < \theta gFn < 0.58 \quad (8).$$

12. The variable magnification optical system according to claim 1, wherein Conditional Expression (9) is satisfied, $$0.5 < \theta gFp < 0.65 \quad (9).$$

13. The variable magnification optical system according to claim 1, wherein assuming that an average value of Abbe numbers of all the positive lenses in the second optical system at a d line is νdp, Conditional Expression (10) is satisfied, $$70 < \nu dp < 100 \quad (10).$$

14. The variable magnification optical system according to claim 1, wherein assuming that an average value of refractive indices of all the positive lenses in the second optical system at a d line is Ndp, Conditional Expression (11) is satisfied, $$1.43 < Ndp < 1.75 \quad (11).$$

15. The variable magnification optical system according to claim 1, wherein Conditional Expression (1-1) is satisfied, $$-0.02 < \theta gFp - \theta gFn < 0.06 \quad (1\text{-}1).$$

16. The variable magnification optical system according to claim 2, wherein Conditional Expression (2-1) is satisfied, $$14 < \nu dp - \nu dn < 35 \quad (2\text{-}1).$$

17. The variable magnification optical system according to claim 3, wherein Conditional Expression (3-1) is satisfied, $$-0.07 < \theta Ctp - \theta Ctn < 0.05 \quad (3\text{-}1).$$

18. The variable magnification optical system according to claim 7, wherein Conditional Expression (4-1) is satisfied, $$0.77 < \theta Ctn < 0.85 \quad (4\text{-}1).$$

19. The variable magnification optical system according to claim 8, wherein Conditional Expression (5-1) is satisfied, $$0.78 < \theta Ctp < 0.85 \quad (5\text{-}1).$$

20. An imaging apparatus comprising the variable magnification optical system according to claim 1.

* * * * *